United States Patent
Nishimura

(10) Patent No.: US 7,729,012 B2
(45) Date of Patent: Jun. 1, 2010

(54) IMAGE PROCESSING APPARATUS, METHOD OF CONTROLLING IMAGE PROCESSING APPARATUS, IMAGE RECOGNITION METHOD, IMAGE FORMING APPARATUS, INFORMATION PROCESSING APPARATUS, AND DATA PROCESSING METHOD

(75) Inventor: Yutaro Nishimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1030 days.

(21) Appl. No.: 11/398,616

(22) Filed: Apr. 6, 2006

(65) Prior Publication Data
US 2006/0232852 A1   Oct. 19, 2006

(30) Foreign Application Priority Data
Apr. 8, 2005   (JP) .............................. 2005-111557

(51) Int. Cl.
H04N 1/40   (2006.01)
(52) U.S. Cl. .................................... 358/2.1; 358/442
(58) Field of Classification Search ................. 358/1.9, 358/2.1, 1.15–1.17, 500, 504–505, 442, 444, 358/468, 462
See application file for complete search history.

(56) References Cited

U.S. PATENT DOCUMENTS

| | | | |
|---|---|---|---|
| 5,907,410 A | 5/1999 | Ohtake | |
| 6,266,152 B1 | 7/2001 | Nakajima | |
| 6,424,742 B2 | 7/2002 | Yamamoto et al. | |
| 6,452,173 B1 * | 9/2002 | Oi ............................... | 850/43 |
| 6,757,071 B1 * | 6/2004 | Goodman et al. ........... | 358/1.13 |
| 7,090,417 B2 * | 8/2006 | Roztocil et al. ............... | 400/62 |
| 2004/0080789 A1 * | 4/2004 | Anderson ..................... | 358/2.1 |
| 2006/0244988 A1 * | 11/2006 | Oishi ......................... | 358/1.13 |
| 2007/0046957 A1 * | 3/2007 | Jacobs et al. .................. | 358/1.9 |
| 2008/0198418 A1 * | 8/2008 | Nagatsuma .................. | 358/2.1 |

FOREIGN PATENT DOCUMENTS

| | | |
|---|---|---|
| JP | 9-212325 | 8/1997 |
| JP | 9-270929 | 10/1997 |
| JP | 11-69150 | 3/1999 |
| JP | 2002-259205 | 9/2002 |
| JP | 2002-268940 | 9/2002 |
| JP | 2003-67243 | 3/2003 |
| JP | 2003-91425 | 3/2003 |
| JP | 2003-244452 | 8/2003 |
| JP | 2003-271336 | 9/2003 |
| JP | 2003-303038 | 10/2003 |
| JP | 2004-101870 | 4/2004 |
| JP | 2004-128913 | 4/2004 |
| JP | 2004-171237 | 6/2004 |
| JP | 2005-197960 | 7/2005 |

* cited by examiner

*Primary Examiner*—Thomas D Lee
*Assistant Examiner*—Stephen M Brinich
(74) *Attorney, Agent, or Firm*—Oblon, Spivak, McClelland, Maier & Neustadt, L.L.P.

(57) ABSTRACT

An image processing apparatus is disclosed that controls a user interface according to image properties. The image processing apparatus includes a document data acquiring unit to acquire document data, an image recognizing unit to determine the image properties of the document data including a color and a gray level of the document data so as to generate recognition data, and a user interface providing unit to receive the recognition data so as to provide the user interface. Operations that can be performed on the document data by the image processing apparatus through the user interface vary according to the recognition data.

10 Claims, 21 Drawing Sheets

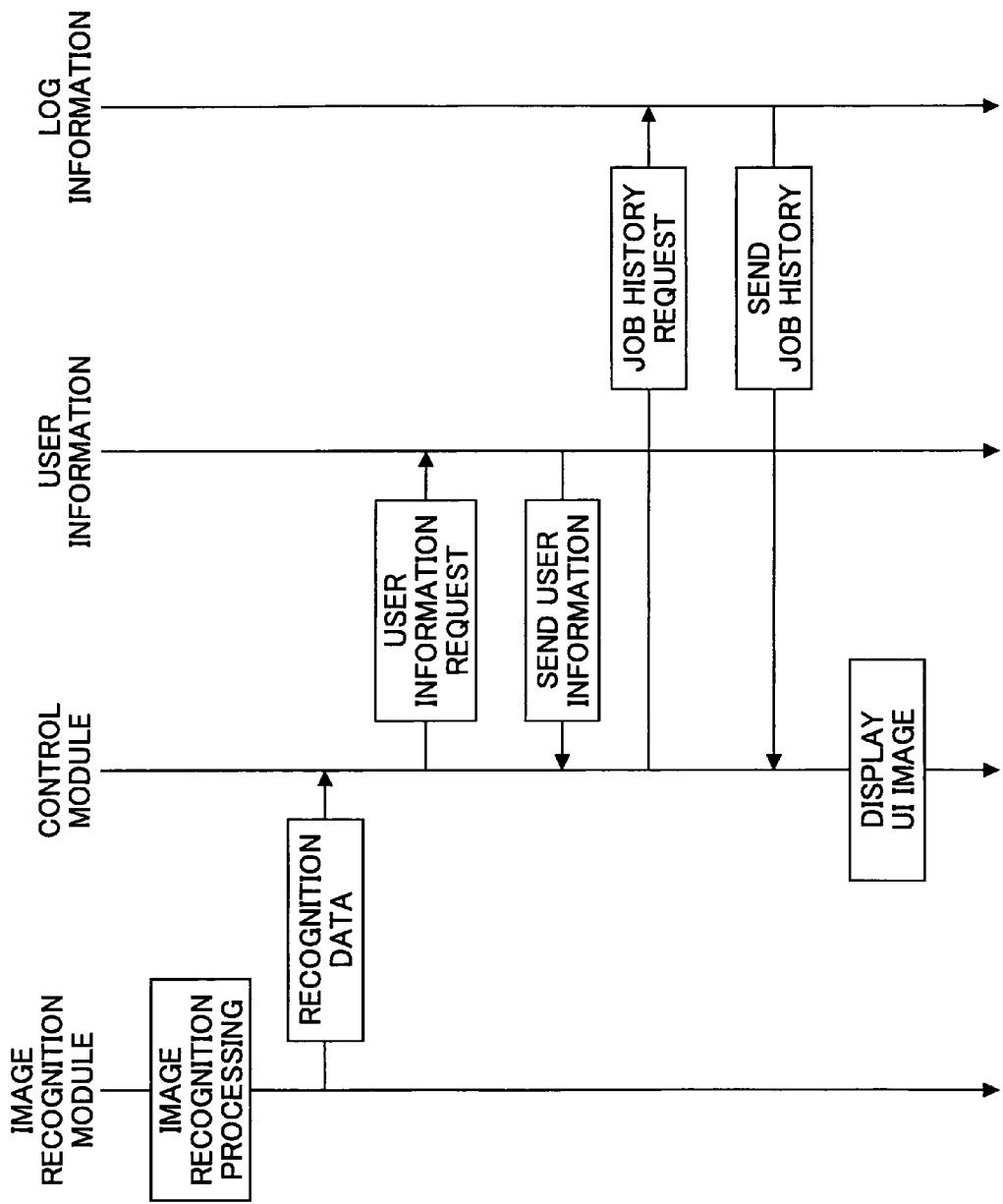

FIG.19A

| IMAGE IDENTIFICATION CODE | RECOGNITION DATA/ INC. BINARY OR HALFTONE | STORAGE AREA IDENTIFIER |
|---|---|---|
| 0001 | 1 | *****-***** |
| 0002 | 0 | *****-***** |
| 0003 | 0 | *****-***** |
| 0004 | 1 | *****-***** |
|  | 0 | *****-***** |
|  | 1 | *****-***** |
| ⋮ | ⋮ | ⋮ |

FIG.19B

| IMAGE IDENTIFICATION CODE /RECOGNITION DATA | STORAGE AREA IDENTIFIER |
|---|---|
| 0001-1 | *****-***** |
| 0002-0 | *****-***** |
| 0003-0 | *****-***** |
| 0004-1-1 | *****-***** |
| 0004-2-0 | *****-***** |
| 0004-3-1 | *****-***** |
| ⋮ | ⋮ |

FIG.20

| USER A | | |
|---|---|---|
| IMAGE IDENTIFICATION CODE | RECOGNITION DATA/ INC. BINARY OR HALFTONE | STORAGE AREA IDENTIFIER |
| 0001 | 1 | ******-****** |
| 0002 | 0 | ******-****** |
| 0003 | 0 | ******-****** |
| 0004 | 1 | ******-****** |
| ... | 0 | ******-****** |
| | 1 | ... |
| | ... | |

| USER B | | |
|---|---|---|
| IMAGE IDENTIFICATION CODE | RECOGNITION DATA/ INC. BINARY OR HALFTONE | STORAGE AREA IDENTIFIER |
| | * | ******-****** |
| | * | ******-****** |
| | * | ******-****** |
| | * | ******-****** |
| | * | ******-****** |
| | * | ******-****** |
| | | ... |

| USER C | | |
|---|---|---|
| IMAGE IDENTIFICATION CODE | RECOGNITION DATA/ INC. BINARY OR HALFTONE | STORAGE AREA IDENTIFIER |
| | * | ******-****** |
| | * | ******-****** |
| | * | ******-****** |
| | * | ******-****** |
| | * | ******-****** |
| | * | ******-****** |
| | | ... |

...

IMAGE PROCESSING APPARATUS, METHOD OF CONTROLLING IMAGE PROCESSING APPARATUS, IMAGE RECOGNITION METHOD, IMAGE FORMING APPARATUS, INFORMATION PROCESSING APPARATUS, AND DATA PROCESSING METHOD

BACKGROUND OF THE INVENTION

1. Field of the Invention

The present invention generally relates to an image processing technique, and particularly relates to an image processing apparatus, such as a Multi-Function Peripheral (MFP), a method of controlling an image processing apparatus, an image recognition method, an image forming apparatus, an information processing apparatus, and a data processing method for controlling screen display according to properties of an image to be processed.

2. Description of the Related Art

In recent years, along with advance in technology for hardware such as semiconductors and computers as well as in optical technology, image processing apparatuses using electrophotography have become able to offer many functions. The image processing apparatuses process not only binary images but also full-color halftone images. In many cases, users perform different operations, such as an operation using an OCR system, full-color copying, and monochrome copying, depending on the type of images, such as binary images and full-color images.

Generally, a user touches a touch panel display provided on the front side of an image processing apparatus so as to display an operation screen for an operation that the user wants to perform on a document, and inputs a command to the image processing apparatus by selecting the operation. The user can select the operation because the user knows properties of the document to be processed and knows which operation is suitable for the document. In other words, when the user uses the image processing apparatus, the user determines whether the document is a binary image such as text or a full-color image such as a halftone image, with or without being aware, so as to select a suitable operation.

Recent image processing apparatuses comprise nonvolatile memories and hard disks and can serve as information processing apparatuses. With such image processing apparatuses, users can perform read-out operations, printing operations, and sending operations by facsimile or by mail on document data items saved in the apparatuses as necessary. If a user wants to process a document data item that the user has saved in an image processing apparatus in the past but does not remember properties of the document data item, the user refers to a hard copy of the corresponding document or displays the document data item on a display of the image processing apparatus, checks all the pages of the document if the document has multiple pages, and thus determines a suitable operation. As a result, the amount of time that the user uses the image processing apparatus is increased. That is, providing large-capacity memories with image processing apparatuses may actually lower working efficiency of the image processing apparatuses.

If the image processing apparatuses can automatically determine image properties of documents to be processed and display suitable operation options to users, the frequency of the users determining image properties of documents and making operating errors may be reduced. Moreover, as working efficiency of the image processing apparatuses is increased, usability of the image processing apparatuses can be improved.

If the image processing apparatus can prompt users to select suitable operations based on properties of documents to be processed, the users do not need to determine which operations are suitable based on the type of documents, such as monochrome binary images and full-color images, and can easily perform operations on the documents with less burden.

If selection of operations to be performed on document data saved in an image processing apparatus can be controlled from an information processing apparatus based on properties of the saved document data, usability of the document data saved in the image processing apparatus and working efficiency of the image processing apparatus can be improved, thereby reducing the burden on users.

There have been disclosed techniques related to the image processing apparatuses, such as a technique for varying control depending on properties of images to be printed, a technique for enabling remote control from a remote server by reproducing an operations section of an image processing apparatus, and a technique for user authentication using password or the like. For example, Japanese Patent Laid-Open Publication No. 2004-101870 (Patent Document 1) discloses a technique for controlling output of an image processing apparatus depending on image properties. The image processing apparatus comprises an area dividing unit for dividing an area of an image of a page to be printed into plural areas, and applying different saving rates of coloring agent to different areas.

The technique disclosed in Patent Document 1 is for controlling the image processing apparatus depending on properties of a page to be printed, but is not for efficiently providing a user interface based on properties of a page to be printed.

Japanese Patent Laid-open publication No. 2003-271336 (Patent Document 2) discloses a technique for remotely controlling an image processing apparatus from a remote server using a user interface displayed on the server. According to Patent Document 2, the server is connected to the image processing apparatus via a network. The server comprises an emulation unit that receives an intermediate code program from the image processing apparatus so as to reproduce a user interface of the image processing apparatus on an operations section of the server. In response to an input from the user interface reproduced in the operations section of the server, a selected image stored in the server is transmitted to the image processing.

The technique disclosed in Patent Document 2 is for causing the server to receive the intermediate code program from the image processing apparatus and display the user interface of the image processing apparatus reproduced by the emulation unit in order to cause the image processing apparatus to print document data stored in the remote server, but does not relates to a technique for controlling the user interface depending on properties of the document data.

Japanese Patent Laid-open Publication No. 2004-171237 (Patent Document 3) discloses an image processing apparatus that controls access to a storage unit using passwords. Patent Document 3 discloses a technique for providing different user interfaces depending on results of password authentication, but does not disclose a technique for providing different user interfaces for different valid passwords and for documents having different properties so as to guide users to execute suitable operations.

As described above, a method for controlling printing operations of an image processing apparatus based on image properties and a method for causing a server to reproduce a user interface of an image processing apparatus so as to cause the image processing apparatus to print a document stored in the server have been disclosed. Meanwhile, there has been and continues to be a demand for image processing apparatuses, image recognition methods, image forming apparatuses, information processing apparatuses, data processing methods, and methods of controlling image processing apparatuses that can improve usability of image processing apparatuses by controlling user interfaces based on properties of images to be processed and user identifiers.

There has also been and continues to be a demand for image processing apparatuses, methods of controlling image processing apparatuses, image recognition methods, image forming apparatuses, information processing apparatuses, and data processing methods that can improve usability of image processing apparatuses equipped with large-capacity storage units, such as hard disks, EPROMs, and EEPROMs, by providing user interfaces that efficiently guide users to perform operations based on properties of documents acquired by the image processing apparatuses.

SUMMARY OF THE INVENTION

The present invention may solve at least one problem described above.

In one embodiment of the present invention, in order to solve at least one problem described above, there is provided a user interface, through which operations that can be performed vary depending on properties of a document to be processed by an image processing apparatus, thereby improving accessibility of the image processing apparatus.

The image processing apparatus performs image recognition processing on a document to be processed in response to a job request from a user so as to determine whether a document data item to be processed contains only a monochrome binary image or determine whether a document data item to be processed contains only a monochrome binary image, a color binary image, a monochrome halftone image, or a color halftone image.

After determination of properties of the document data item is completed, a user interface that allows a user to perform operations corresponding to the determined properties of the document data item is displayed on a control panel of the image processing apparatus or on a display of an information processing apparatus, such as a server or a personal computer, disposed in a remote location. Thus, a user can efficiently perform operations corresponding to properties of the document data item using the displayed user interface.

In another embodiment of the present invention, a document containing a multilevel image and a document containing an image that is not a multilevel image are saved into an image processing apparatus with different recognition data items. Upon processing one of the saved documents, the image processing apparatus acquires the corresponding recognition data item and determines whether the document is a multilevel image, and provides a user interface suitable for the document without performing image processing or while performing image processing in parallel.

According to an aspect of the present invention, there is provided an image processing apparatus that controls a user interface according to image properties. The image processing apparatus comprises a document data acquiring unit to acquire document data, an image recognizing unit to determine the image properties of the document data including a color and a gray level of the document data so as to generate recognition data, and a user interface providing unit to receive the recognition data so as to provide the user interface, wherein operations that can be performed on the document data by the image processing apparatus through the user interface vary according to the recognition data.

According to another aspect of the present invention, there is provided a method of controlling an image processing apparatus that controls a user interface according to image properties. The method causes the image processing apparatus to execute a step of acquiring document data, a step of generating recognition data by determining image properties of the document data including a color and a gray level of the document data, and a step of providing the user interface, wherein operations that can be performed on the document data by the image processing apparatus through the user interface vary according to the recognition data.

According to still another aspect of the present invention, there is provided an image recognition method of recognizing image properties of acquired document data. The method causes an image processing apparatus to execute a step of acquiring document data, a step of acquiring gray level data and two-dimensional dispersion of pixels contained in the document data, a step of determining whether the document data contain only one or more binary images, and a step of determining whether CMY data are contained in the document data if the document data are determined to contain only one or more binary images.

According to a further aspect of the present invention, there is provided an image forming apparatus for processing document data that comprises a CPU, a first storage unit, an image recognizing unit to read out document data and determine image properties of the read-out document data including a color and a gray level of the document data so as to generate recognition data, a user interface providing unit to receive the recognition data so as to provide a user interface, wherein operations that can be performed on the document data through the user interface vary according to the recognition data, and a second storage unit to store a data structure in which the document data and the recognition data are associated with each other.

According to another further aspect of the present invention, there is provided an information processing apparatus for processing document data that comprises a CPU, a first storage unit, an image recognizing unit to read out document data in response to an external input and determine image properties of the read-out document data including a color and a gray level of the document data so as to generate recognition data, a user interface providing unit to receive the recognition data so as to provide a user interface, wherein operations that can be performed on the document data through the user interface vary according to the recognition data, and a second storage unit to store a data structure in which user data corresponding to the external input, the document data, and the recognition data are associated with each other.

According to another further aspect of the present invention, there is provided a data processing method of processing document data. The method causes an information processing apparatus including a CPU and a storage unit to execute a step of reading out document data and determining image properties of the read-out document data including a color and a gray level of the document data so as to generate recognition data, a step of receiving the recognition data so as to provide a user interface, wherein operations that can be performed on the document data through the user interface vary according to the recognition data, and a step of generating and storing a data structure in which the document data and the recognition data are associated with each other.

According to an embodiment of the present invention, since a user interface is controlled based on properties of a document to be processed or result of user authentication, usability is improved.

Moreover, since a user interface that efficiently guides a user to perform operations is provided based on properties of a document acquired by an image processing apparatus, usability of an information processing apparatus, such as an image processing apparatus, equipped with a large-capacity storage unit, such as a hard disk, an EPROM, and an EEPROM, can be improved.

According to an embodiment of the present invention, an image processing apparatus can be controlled by an information processing apparatus disposed in a remote location from the image processing apparatus while ensuring user security.

BRIEF DESCRIPTION OF THE DRAWINGS

FIG. 7 is a chart showing a control sequence according to an embodiment of the present invention;

FIGS. 19A and 19B show corresponding structures of data including recognition data items generated in an embodiment of the present invention;

FIG. 20 shows a structure of data including recognition data items generated in an embodiment of the present invention.

DETAILED DESCRIPTION OF THE PREFERRED EMBODIMENT

While the present invention is described herein with reference to specific embodiments illustrated in the accompanying drawings, it should be understood by those skilled in the art that the present invention is not limited to the embodiments disclosed herein.

A. User Interface Displayed on Operations Panel (A-1: User Interface Displayed by Control Module)

Figure 1:
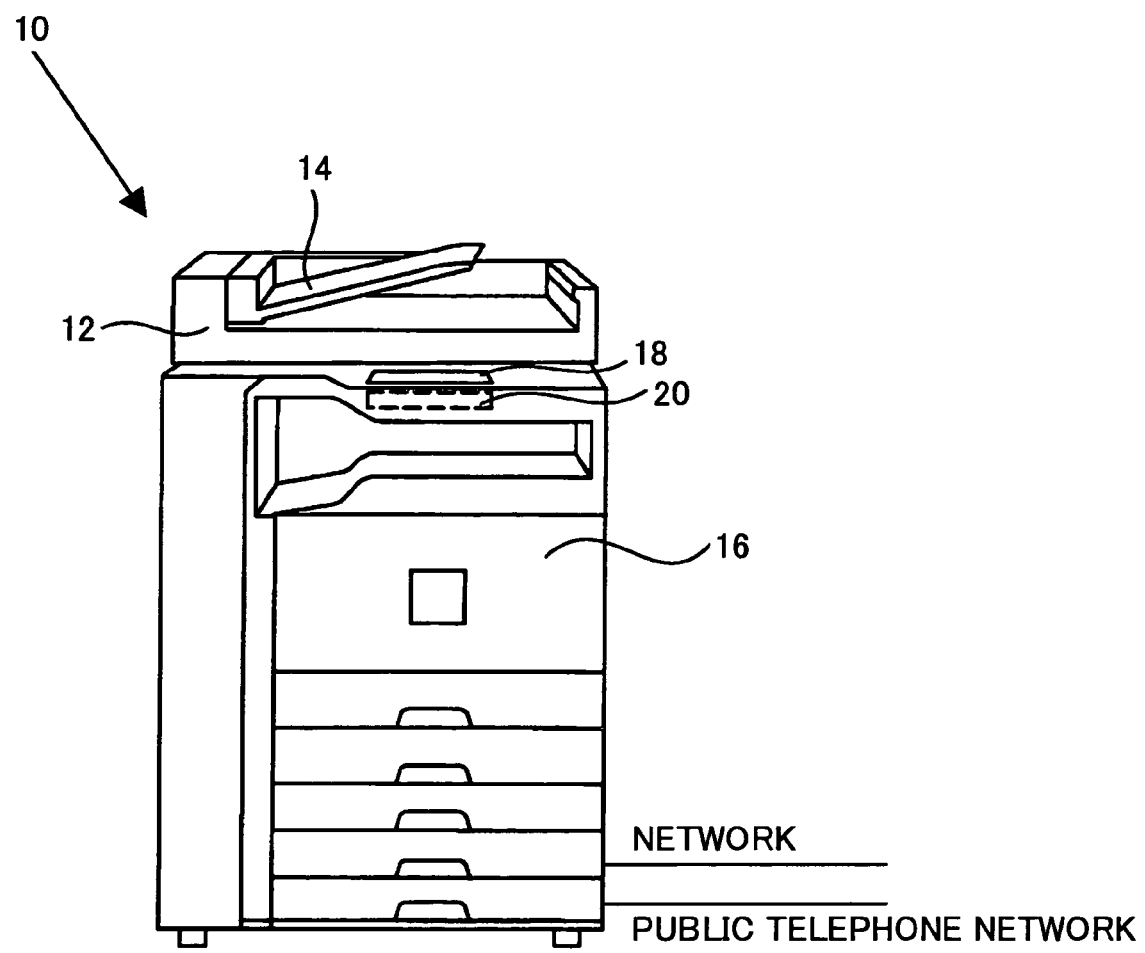
FIG. 1 is a schematic diagram showing an image processing apparatus according to an embodiment of the present invention.

FIG. 1 is a schematic diagram showing an image processing apparatus 10 according to an embodiment of the present invention. The image processing apparatus 10 is generally configured for using electrophotography, and comprises a feeder module 12, an auto feeder 14 attached to the feeder module 12, and a main body section 16 for accommodating a photoreceptor, an image developing device, and an image fixing device. The image processing apparatus 10 has an auto document feeder (ADF) function utilizing an optical reading device that includes a CCD array. The image processing apparatus 10 is adapted to load document data items read by the ADF into volatile memory such as RAM for display operations or into nonvolatile memory or a hard disk depending on types of operations to be performed, and performs operations, such as reading, printing, converting with optical character recognition (OCR), and e-mail transmission, on the held document data items in response to user requests.

Users operate the image processing apparatus 10 of FIG. 1 using input keys and an operations panel 18 disposed on the front face of the image processing apparatus 10, both serving as user interfaces. The operations panel 18 displays a user interface image under the control of a control module 20 disposed near the operations panel 18. The image processing apparatus 10 is connected to a public telephone network and a network for data communications such as ADSL or ISDN, and has facsimile machine functions as well. The image processing apparatus 10 of FIG. 1 includes a network interface (not shown) for Ethernet™ or the like, and supports communications of data in the form of packets or frames via a local area network (LAN), a wide area network (WAN), or the Internet.

Figure 2:
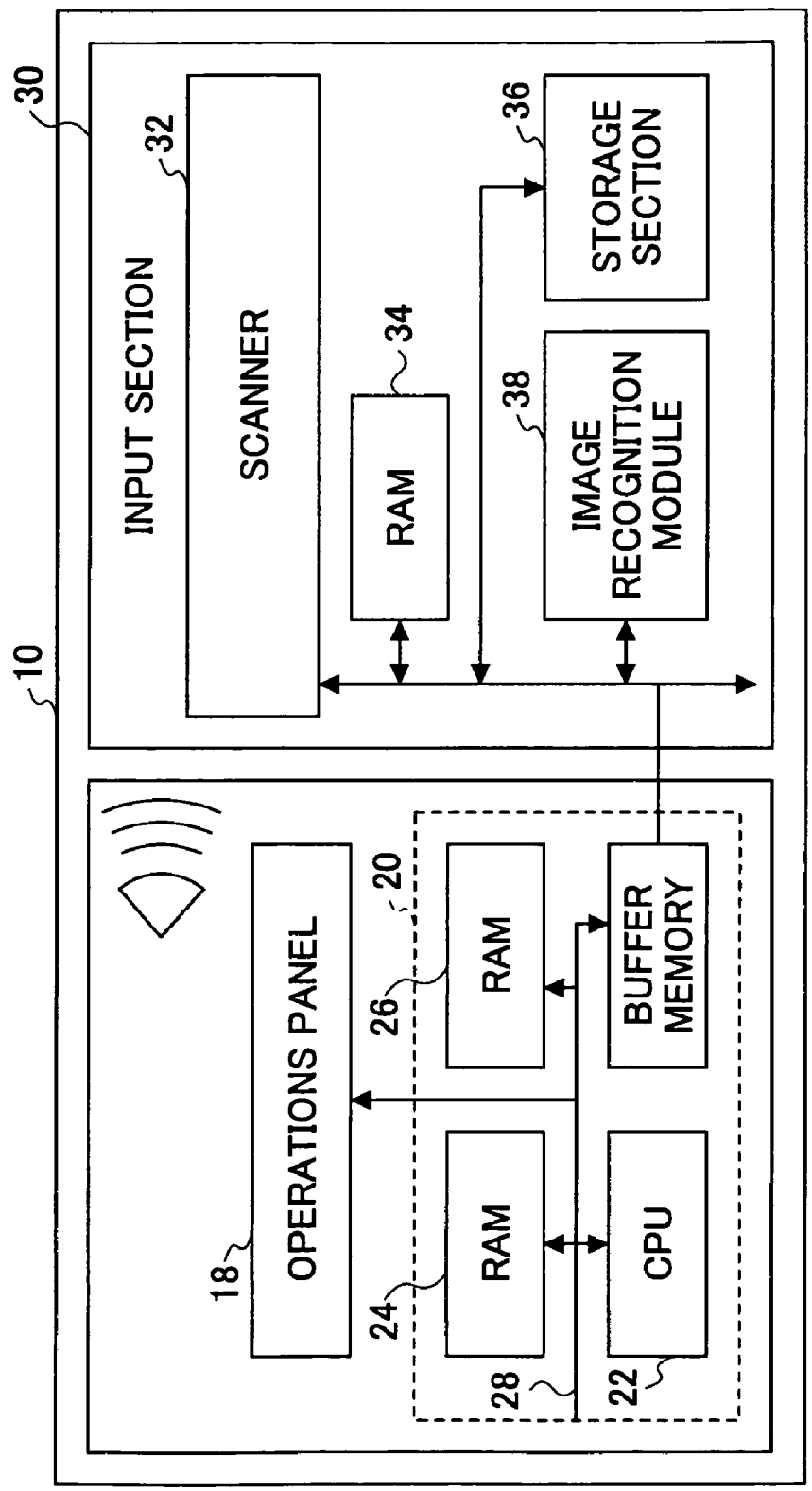
FIG. 2 is a block diagram schematically showing a hardware configuration of an embodiment of an image processing apparatus according to the present invention.

FIG. 2 shows a hardware configuration of the image processing apparatus 10 comprising the operations panel 18, the control module 20, and an input section 30 including a scanner 32 according to an embodiment of the present invention. The image processing apparatus 10 includes a CPU 22, at least a readable and writable memory, such as a RAM 24, used for processing by the CPU 22, and a nonvolatile storage medium, and has functions for processing images. In the image processing apparatus 10 of this embodiment of the present invention, the operations panel 18 is configured as a touch panel and comprises a monochrome LCD or a color LCD to display a user interface (UI) image.

The control module 20 generally comprises the CPU 22, the RAM 24 used for processing by the CPU 22, and a video RAM (VRAM) 26 for holding UI images to be displayed on the operations panel 18, These components are connected to each other via an internal bus 28. The control module 20 further comprises a buffer memory for temporarily holding data sent from other modules.

In this embodiment, the input section 30 is configured to digitally acquire a document data item using the scanner 32, although the input section 30 may include other functions. The document data item acquired by the scanner 32 is held in a RAM 34 to be processed. The document data item is converted into an image and, in response to a command from a user, held in a storage section 36 including a nonvolatile storage device such as an EPROM, an EEPROM, and a hard disk, in a known format such as RGB, CMYK, or CIEL-L*a*b*. The input section 30 further includes an image recognition module 38 to perform image recognition processing on the document data item held in the RAM 34. In the present invention, the document data item may be acquired by reading out from the storage section 36 or by download or delivery via networks, other than by reading from the ADF or the like.

In the case of acquiring the document data item by reading out from the storage section 36, a control unit that controls the storage section 36 or a module that issues read commands is responsible for acquiring the document data item. In the case of acquiring the document data item by download or delivery via networks, a Web browser or mail software of the image processing apparatus 10 or an information processing apparatus is used. According to the present invention, each of the function sections does not have to be configured as a module as illustrated in the drawings, and may be configured in any form or configured as function means as long as each function section offers a desired function according to intended use.

In an alternative embodiment of the present invention, the image processing apparatus 10 includes a microphone for providing audio guidance as a user interface, e.g., a microphone for providing speech registered by a user in advance or by reading out text documents for guiding predetermined operations with a synthetic voice.

When the image processing apparatus 10 is powered on, the image processing apparatus 10 is put into a standby mode wherein, in many cases, a UI image corresponding to a copy operation screen is displayed. When a user enters a user identifier into the image processing apparatus 10, a user identifying section (not shown) of the image processing apparatus 10 identifies the user identifier. According to the identification result obtained by the user identifying section, the image processing apparatus 10 forms or reads out a default UI image for authenticated users or a UI image for specific users and displays the UI image on the operations panel 18. In one embodiment of the present invention, when the user is authenticated, a UI image that allows effective image processing appropriate for images of the document data item acquired by the image processing apparatus 10 is provided.

In the embodiment of the present invention shown in FIG. 2, an image data item is formed according to a result of password authentication or a result of document image analysis after the CPU 22 of the control module 20 is powered on, and the formed image data item is written into the RAM 26 and displayed as a UI image on the LCD of the operations panel 18. In an alternative embodiment of the present invention, a predetermined UI image data item is formed in advance and held in an storage area in the image processing apparatus 10, e.g., a predetermined area of the storage section 36. In this alternative embodiment, when the control module 20 receives a report of image properties from the image recognition module 38, the control module 20 may read out the corresponding UI image data item from the storage area, e.g., of the storage section 36, and display the read UI image data item as a UI image on the operations panel 18.

Figure 3A:
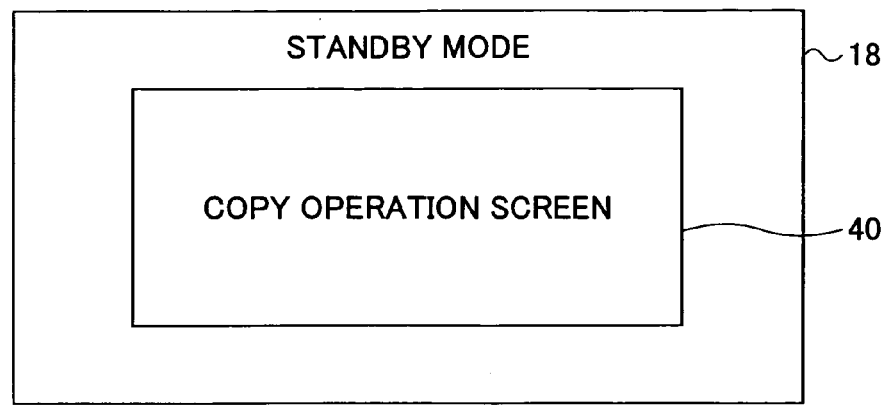
FIGS. 3A-3C are diagrams for explaining switching of UI images according to an embodiment of the present invention.
Figure 3B:
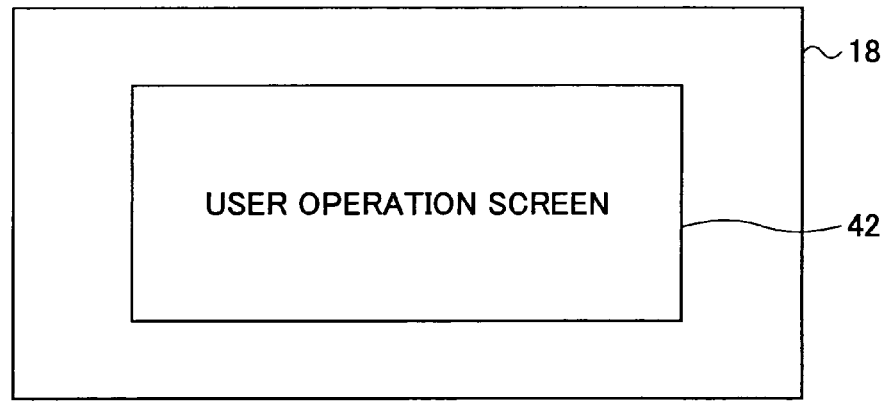
Figure 3C:
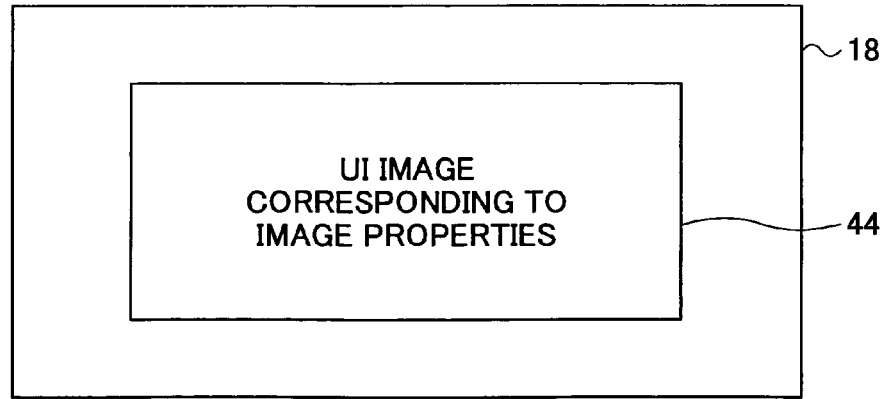

FIGS. 3A-3C are diagrams for explaining switching of UI images provided as user interfaces according to an embodiment of the present invention. When the image processing apparatus 10 is powered on, the image processing apparatus 10 is in the standby mode wherein a UI image 40 such as the copy operation screen is displayed on the operations panel 18. When a user uses the image processing apparatus 10 in a user identification mode, the user enters a unique user identifier assigned to the user.

The user identifier may be, for example, for granting personal authentication to the user, for granting an access right to the image processing apparatus 10 to the user, or for granting both the personal authentication and the access right. In one embodiment of the present invention, the user identifier may be used for granting personal authentication to the user, and a user authentication function using a user authentication system such as a shared secret key system using a secret key, a public key system using a public key, RSA cryptography, and Elliptic Curve Cryptography, as well as an electronic signing function may be used for personal authentication. When a user identifier is entered by a user, a user information management section (not shown), for example, searches for the entered user identifier in a look-up table in which user identifiers are registered, or the user identifier is decrypted. If the user identifier is detected or if the decryption is succeeded, personal authentication or an access right is granted. Then the image processing apparatus 10 executes an operation corresponding to the personal authentication or the access right, and displays a user operation screen shown in FIG. 3B.

A UI image 42 shown in FIG. 3B is provided to a user in a user authentication mode after user authentication has succeeded. In the user authentication mode, the same UI image set as default in advance may be provided to all the users. In an alternative embodiment of the present invention, an access log history of an authenticated user specified by the user authentication function may be referred to such that a UI image for executing an operation that is executed by the authenticated user last time is formed or read out and displayed. In another alternative embodiment, statistical processing on access logs of authenticated users is performed in advance, so that a sub-list in which UI images are sorted in descending order of frequency of use on a per-user basis is formed in a nonvolatile memory. Thus, a frequently-used UI image is displayed according to the order in the sub-list.

In this embodiment of the present invention, a user wants to use the ADF and performs an operation to display a UI image for performing ADF operations, so the UI image for performing ADF operations is displayed on the operations panel 18. Otherwise, a user operation screen in which a field for performing ADF operations is formed is provided in advance. The user places a document to be read by the ADF on the auto feeder 14 and starts the ADF. The image processing apparatus 10 generates a document data item comprising RGB signals and positional data using the optical reading device of the ADF, analyzes the document data item, and determines image properties after or without converting from a RGB color system into a CMYK color system. The image processing apparatus 10 determines the image properties of the acquired document data item, and displays a UI image 44 corresponding to the image properties as shown in FIG. 3C.

The image property determination performed herein is for determining whether the document data item contains a monochrome binary image or contains an image that is not a monochrome binary image, or whether the document data item contains an image identified as monochrome binary, color binary, monochrome halftone, or color halftone. According to the determination result of the image properties of the document data item, the image recognition module 38 of the image processing apparatus 10 generates a recognition data item, forms or reads out a UI image 44 corresponding to the recognition data item, and displays the UI image 44 to the user. The UI image 44 provides utilities corresponding to the image properties. For example, if a document data item is determined as a monochrome binary image, the UI image 44 is formed to not call up a color copy operation field to prevent color mode printing, and to provide input fields that allow smooth use of text conversion by OCR and utilities such as mail. If the document data item is determined as a multilevel image, the UI image 44 is formed to provide input fields for monochrome copy, full-color copy, facsimile transmission, and mail delivery according to intended use of the document. In the present invention, the UI image 44 may be formed by selecting other operations according to particular application and depending on users.

Figure 4:
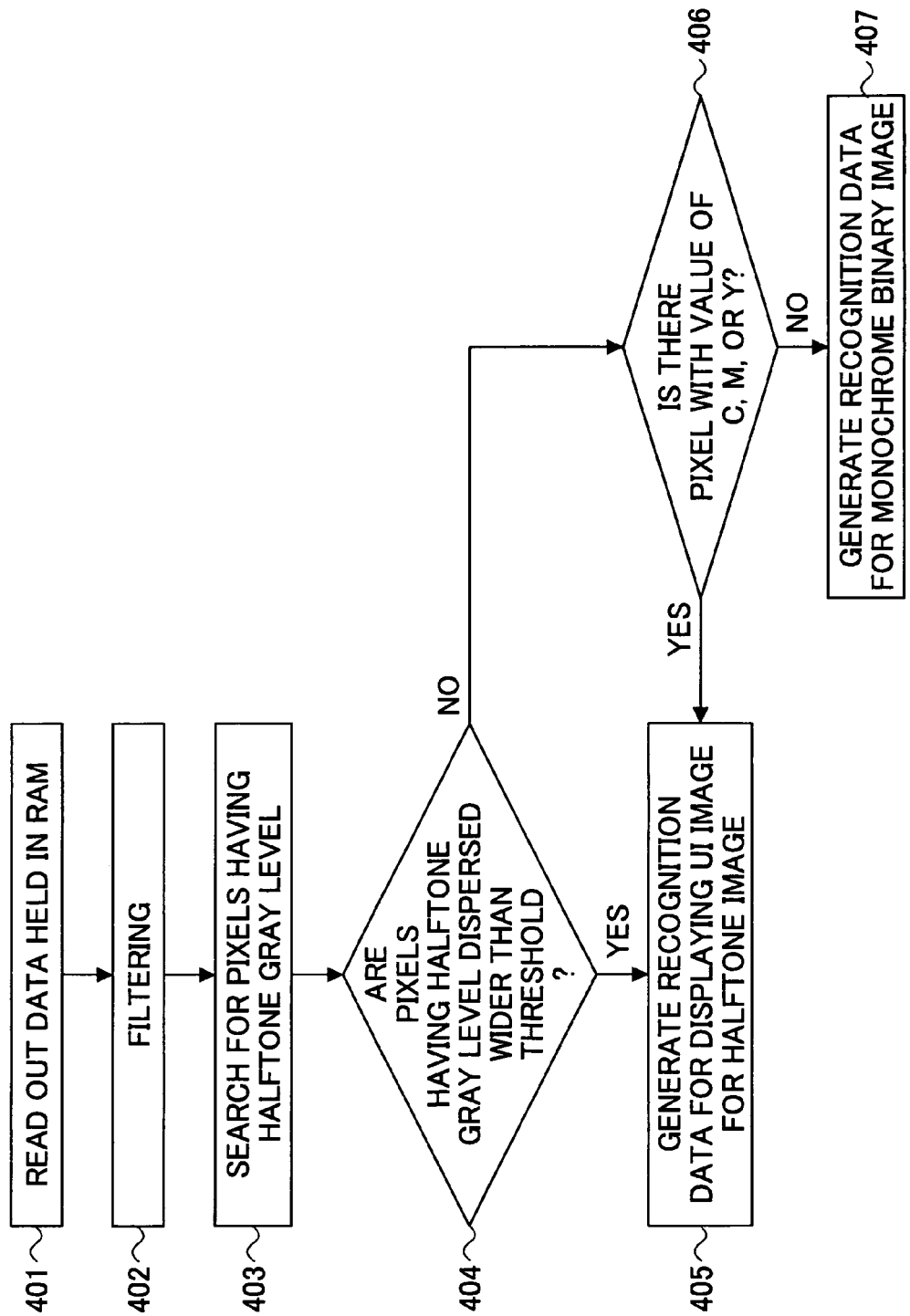
FIG. 4 is a flowchart illustrating image recognition processing according to an embodiment of the present invention.

FIG. 4 is a flowchart illustrating a procedure of determining image properties employed according to an embodiment of the present invention. In this embodiment of the present invention, for determining image properties, a document data item held in the RAM 34 is read out and converted into an image in Step 401. The image is filtered in Step 402. In one embodiment of the present invention wherein there are 256 levels of gray, a pixel gray level higher than an predetermined upper threshold is identified as FF and a pixel gray level lower than a predetermined lower threshold is identified as 00. In the present invention, the number of gray levels is not limited to 256 and may be 32 gray levels, 64 gray levels, etc., depending on the bit range of an A/D converter in use or the memory capacity of the image processing apparatus 10.

According to one embodiment of the present invention, if, for example, the image processing apparatus 10 supports a bitmap format in which colors of the bitmap are directly specified, image properties can be determined by filtering lower bit values of color [ ] of bitmap data after conversion from the RGB system into the CMY system, and determining whether pixels corresponding to color [0]: cyan, color [1]: magenta, color [2]: yellow, and color [3]: black contain values that can be determined to be halftone. According to the present embodiment, document data items in other formats may be used, and similar processing can be performed by using a positional information field corresponding to the format in use and the number of gray bits.

To get back to the description of processing in the present embodiment with reference again to FIG. 4, a halftone image is searched for using the filtered data item in Step 403. A halftone image is searched for by, for example, detecting a pixel having a gray level between the upper threshold and the lower threshold. Then in Step 404, in order to determine, for example, whether the detected pixel is accidentally generated due to a recognition error, gray levels of pixels in a certain area close to the detected pixel are detected. If pixels with gray levels corresponding to halftone are dispersed wider than a predetermined threshold (yes), it is determined that a halftone image is present. If pixels with gray levels corresponding to halftone are not dispersed wider than the predetermined threshold (no), it is determined that a halftone image is not present.

Figure 5:
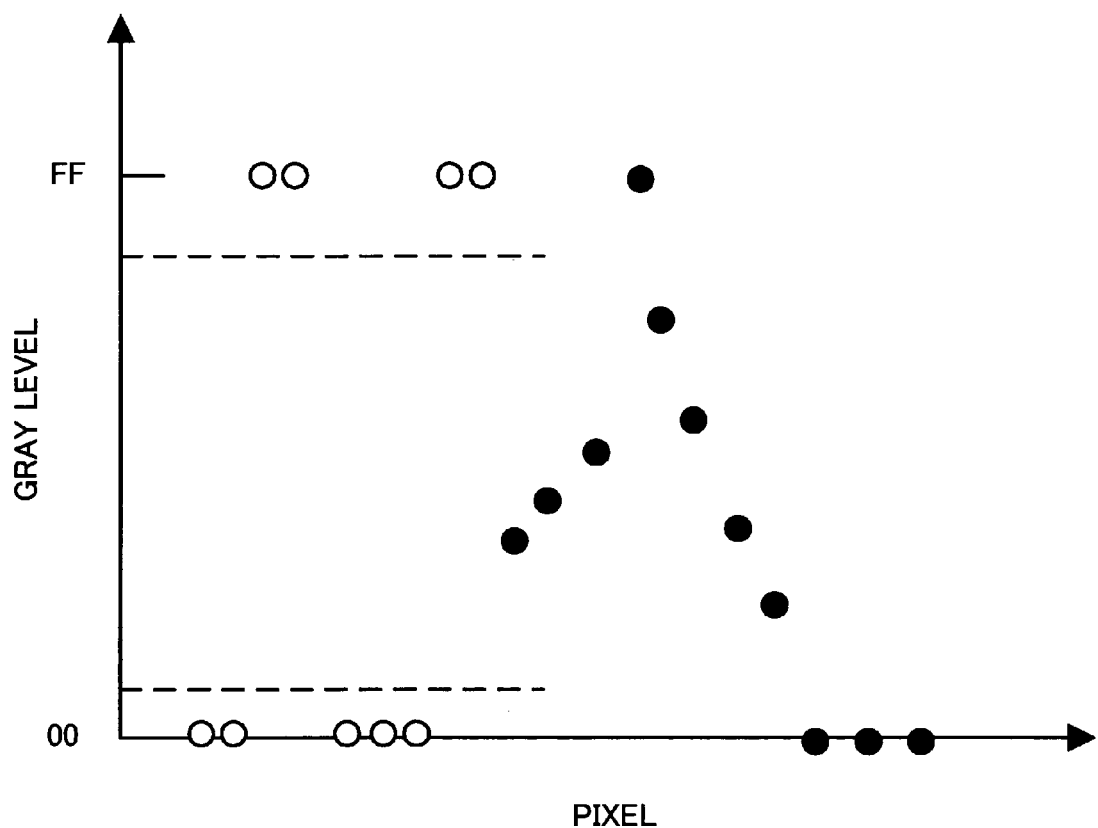
FIG. 5 is a chart for explaining halftone image recognition processing according to an embodiment of the present invention.

FIG. 5 is a chart for explaining filtering performed according to an embodiment of the present invention. In the chart of FIG. 5, the vertical axis represents the gray level (00-FF), and the horizontal axis represents dispersion of pixels. In actual data items read by the ADF or the like, pixels that should have exactly the gray level of FF or 00 might not have the gray level of FF or 00 due to reading conditions and image properties. Thus, accuracy of identifying halftone images is lowered. In view of this, the predetermined upper and lower thresholds are provided such that pixels with gray levels equal to or higher than the upper threshold are determined to be FF and pixels with gray levels equal to or lower than the lower threshold are determined to be 00, thereby improving the accuracy of identifying halftone images. In FIG. 5, gray levels corresponding to the upper and lower thresholds are indicated by corresponding dashed lines. The pixels shown in FIG. 5 indicate pixel dispersion. For example, points indicated by ● represent gray levels of pixels arranged on a predetermined line. In this embodiment, it is preferable to determine gray levels of pixels present in a certain area in order to prevent determination errors due to noise.

The term "certain area" as used herein indicates an area that is at least large enough to recognize a halftone image therein with eyesight. For example, if the pixel size density is 400 dpi, as one dot has a size of about 0.064 mm, the certain area may be about 6.6 mm with 100 dots, or may be about 66 mm with 1000 dots. The above described operation of determination may be performed on pixels out of the certain area, and it is preferable to determine presence of halftone images on the entire document data. According to the present invention, the area to be searched and overlap of areas to be searched may appropriately be determined in view of image size, resolution of the ADF, performance of the CPU in use, and hardware resources in use. In the present invention, any known methods and algorithms for determining presence of halftone images may be used in addition to the above-described method. For instance, there is a finer filtering method as described below. If there are pixels of 20 points with gray level data such as

FF FF 70 00 00

FF FF 80 00 00

FF FF 90 00 00

FF FF 98 00 00, an edge emphasizing filter having a value close to 70, 80, 90, and 98 as an upper threshold or a lower threshold is used. Thus, presence of halftone images can be determined more accurately. In the case of images with higher resolution, image properties may be determined by determining two-dimensional dispersion in an area wider than the area described above.

If, in Step 404, it is determined that a halftone image is present (yes), then in Step 405 a recognition data item for generating a UI image for multilevel halftone images is generated, and the CPU 22 of the control module 20 generates the UI image for multilevel halftone images.

If, in Step 404, it is determined that only binary images are present (no), then in Step 406 it is determined whether a pixel with a value of C, M, or Y is present. If, in Step 406, it is determined that a pixel with a value of C, M, or Y is present (yes), the document data item is determined to comprise a color binary image. Then the processing proceeds to Step 405, in which the recognition data item for displaying the UI image for multilevel halftone images including color images is generated. If, in Step 406, it is determined that a pixel with a value of C, M, or Y is not present (no), the document data item is determined to comprise a monochrome binary image. Then in Step 407, a recognition data item for displaying a UI image for monochrome binary images is generated.

A recognition data item usable in the present invention can be for assigning an identification value according to at least a result of identifying between a multilevel halftone image and a binary image. In one embodiment of the present invention, the recognition data may be generated as a control code of at least one bit so as to differentiate between a multilevel halftone image and a monochrome binary image. In another embodiment of the present invention, if more detailed identification for differentiating between monochrome binary images, color binary images, monochrome halftone images, and full-color halftone images is required, the recognition data may be generated as a control code of at least two bits.

In this invention, programs for generating UI images can be written in any of programming languages that are used by the CPU 22 of the control module 20. Moreover, theses programs can be held in memories such as ROMs, EPROMs, and EEPROMs.

Figure 6A:
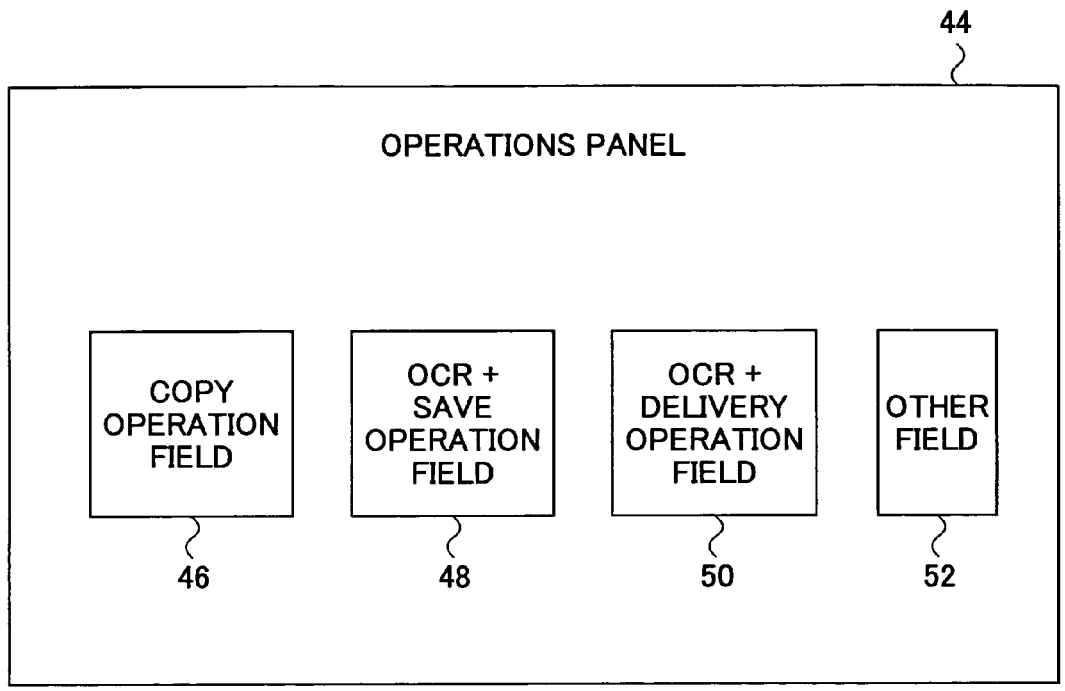
FIGS. 6A and 6B are schematic diagrams, each showing a UI image according to an embodiment of the present invention.
Figure 6B:
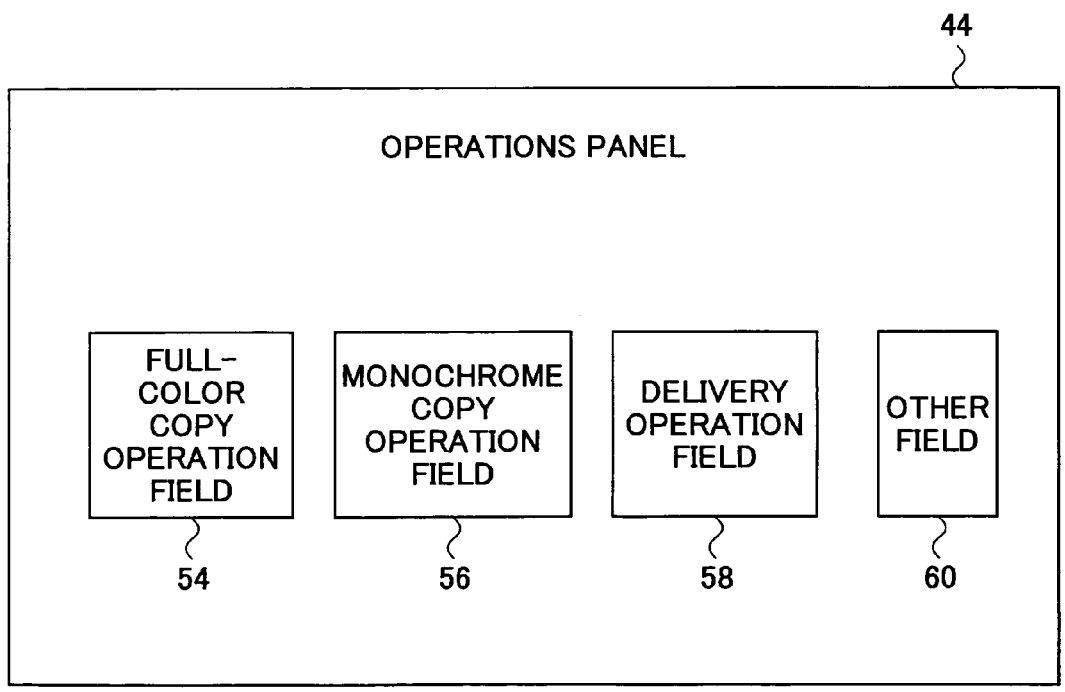

FIGS. 6A and 6B show corresponding UI images 44 that are displayed on the operations panel in a first embodiment of the present invention. FIG. 6A shows the UI image 44 for binary images, and FIG. 6B shows the UI image 44 for multilevel halftone images. If a document data item is determined to be a binary image, as shown in FIG. 6A, the UI image 44 including a monochrome copy operation field 46, (OCR+save) operation field 48, an (OCR+delivery) operation field 50, and an "other" field 52 for selecting other commands to process certain requests from users is displayed. A user can cause the image processing apparatus 10 to perform a desired operation by touching the corresponding field displayed on the operations panel 18.

FIG. 6B shows the UI image 44 that is displayed if a document data item is determined to contain a multilevel halftone image or a color binary image. A full-color copy operation field 54, a monochrome copy operation field 56, a delivery operation field 58, and an other field 60 are displayed on the operations panel 18 such that user can efficiently perform operations corresponding to properties of images contained in the document data item. Although operations using OCR are relatively less frequently performed on color images, the (OCR+save) operations field 48 may be also displayed.

FIG. 7 is a chart showing a control sequence of the image processing apparatus 10 according to the first embodiment of the present invention. When the ADF is started in response to an input from a user, the image recognition module 38 performs image recognition processing on a read document data item. The image recognition module 38 generates a recognition data item of document data and sends the generated recognition data item to the control module 20. In one embodiment of the present invention, a step of requesting user information and a step of acquiring a job history shown in FIG. 7 may be skipped, and one of the UI images 44 shown in FIGS. 6A and 6B may be displayed as a default UI image when the control module 20 receives the recognition data item.

In another embodiment of the present invention, as shown in FIG. 7, the control module 20 may issue to the user information management section a request for user information corresponding to a user identifier. The user information management section may receive the user information request from the control module 20 and send user information to the control module 20. The control module 20 queries an access log management section for a job history based on the acquired user information. The access log management section sends a job history corresponding to the user information to the control module 20. The control module 20 forms or reads out a UI image corresponding to the job history, and displays the UI image on the operations panel 18. The control module can adjust recognition areas of the touch panel such that the recognition areas correspond to the UI image. Then, the user selects a desired operation on the customized UI image displayed on the operations panel 18 so as to cause the image processing apparatus 10 to perform the selected operation.

(A-2: UI Image Control by UI Forming Module)

Figure 8:
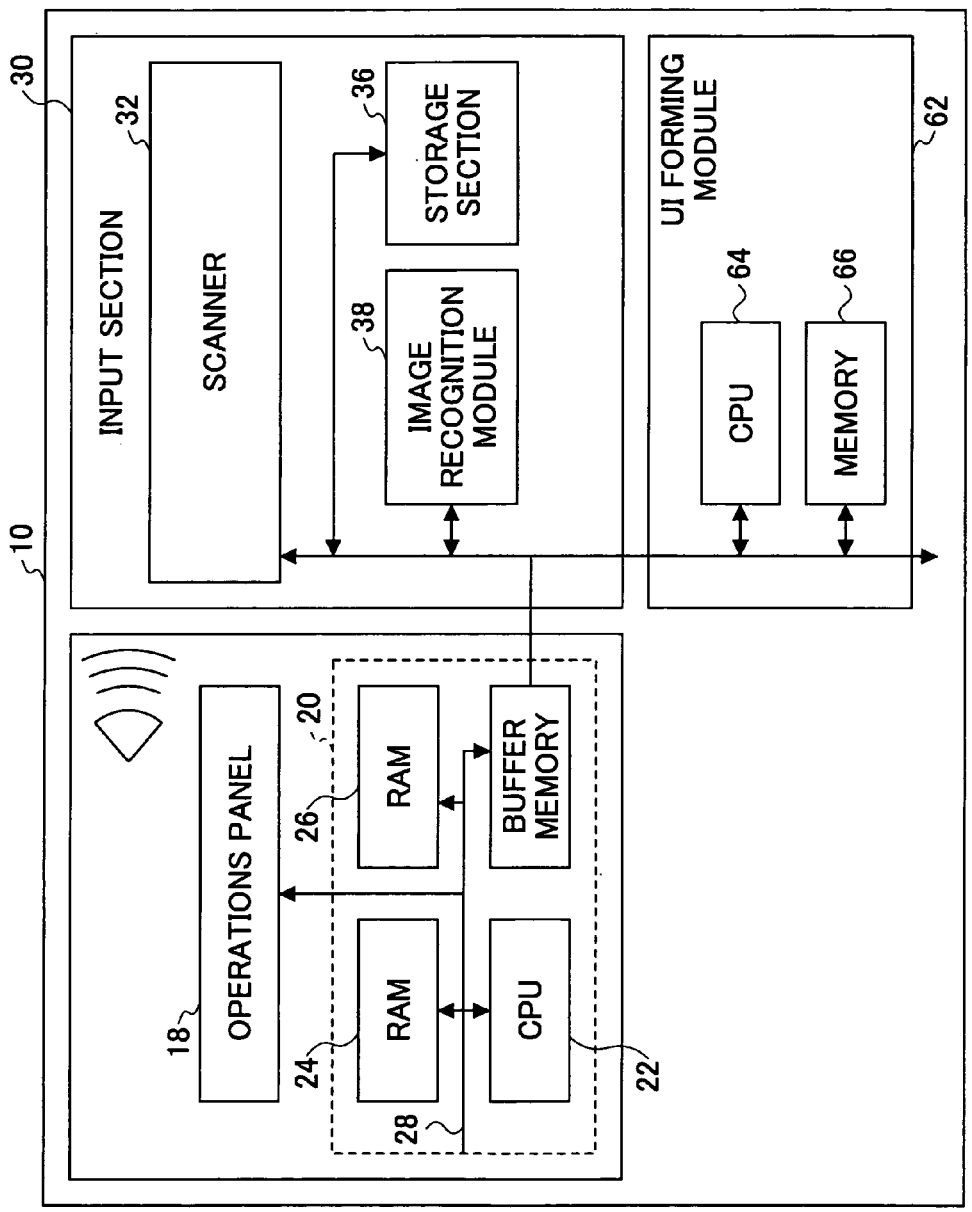
FIG. 8 is a block diagram schematically showing a hardware configuration of an image processing apparatus according to a second embodiment of the present invention.

FIG. 8 is a block diagram schematically showing a configuration of an image processing apparatus 10 according to a second embodiment of the present invention. The image processing apparatus 10 shown in FIG. 8 generally comprises the same control module 20 and input section 30 as those shown in FIG. 2. In the embodiment illustrated in FIG. 8, the image processing apparatus 10 further comprises a UI forming module 62 for processing and managing UI images. The UI forming module 62 comprises a CPU 64 and a memory 66 used for processing performed by the CPU 64. The UI forming module 62 forms/reads out a UI image corresponding to image properties or performs conversion according to a recognition data item of, e.g., 1 bit, 2 bits, decimal code, or hexadecimal code, generated by the image recognition module 38.

In the embodiment illustrated in FIG. 8, overhead of the CPU 22 of the control module 20 can be reduced, so that UI display processing and response performance to user operations are improved. Since the UI forming module 62 is separately provided, UI image processing via a network and UI image customization by users are easily performed.

Figure 9:
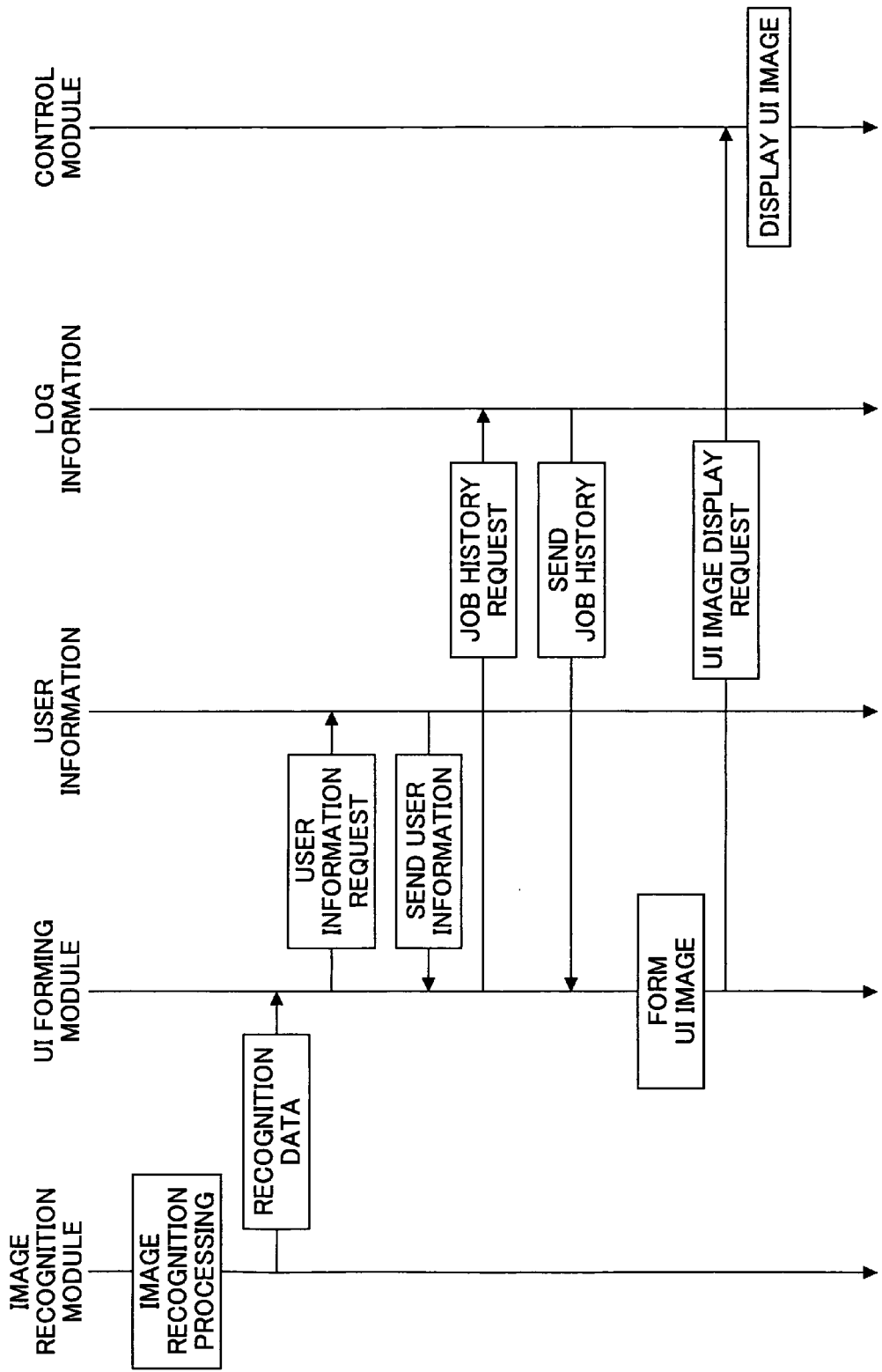
FIG. 9 is a chart showing a control sequence of the image processing apparatus of FIG. 8.

FIG. 9 is a chart showing a control sequence of the image processing apparatus 10 according to the second embodiment of the present invention. The image recognition module 38 performs image recognition processing on a document data item read by the ADF or the like, and sends a generated recognition data item to the UI forming module 62. The UI forming module 62 issues to the user information management section a request for user information. The user information management section sends user information corresponding to a user identifier to the UI forming module 62. The UI forming module 62 issues to the access log management section a request for a job history based on the acquired user information. The access log management section searches for the job history of the corresponding user, and sends the job history to the UI forming module 62. The UI forming module 62 forms a UI image corresponding to the job history of the user.

According to the second embodiment of the present invention, instead of forming a UI image each time a command is received from a user, the UI forming module 62 can form a UI image to be displayed by reading out an image formed or registered by users in advance from an appropriate storage area. Then, the UI image formed or acquired by the UI forming module 62 is sent together with a UI image display request to the control module 20, so that the UI image is displayed on the LCD of the operations panel.

B. Network Control on UI Image (B-1: UI Image Formation by External Information Processing Apparatus)

Figure 10:
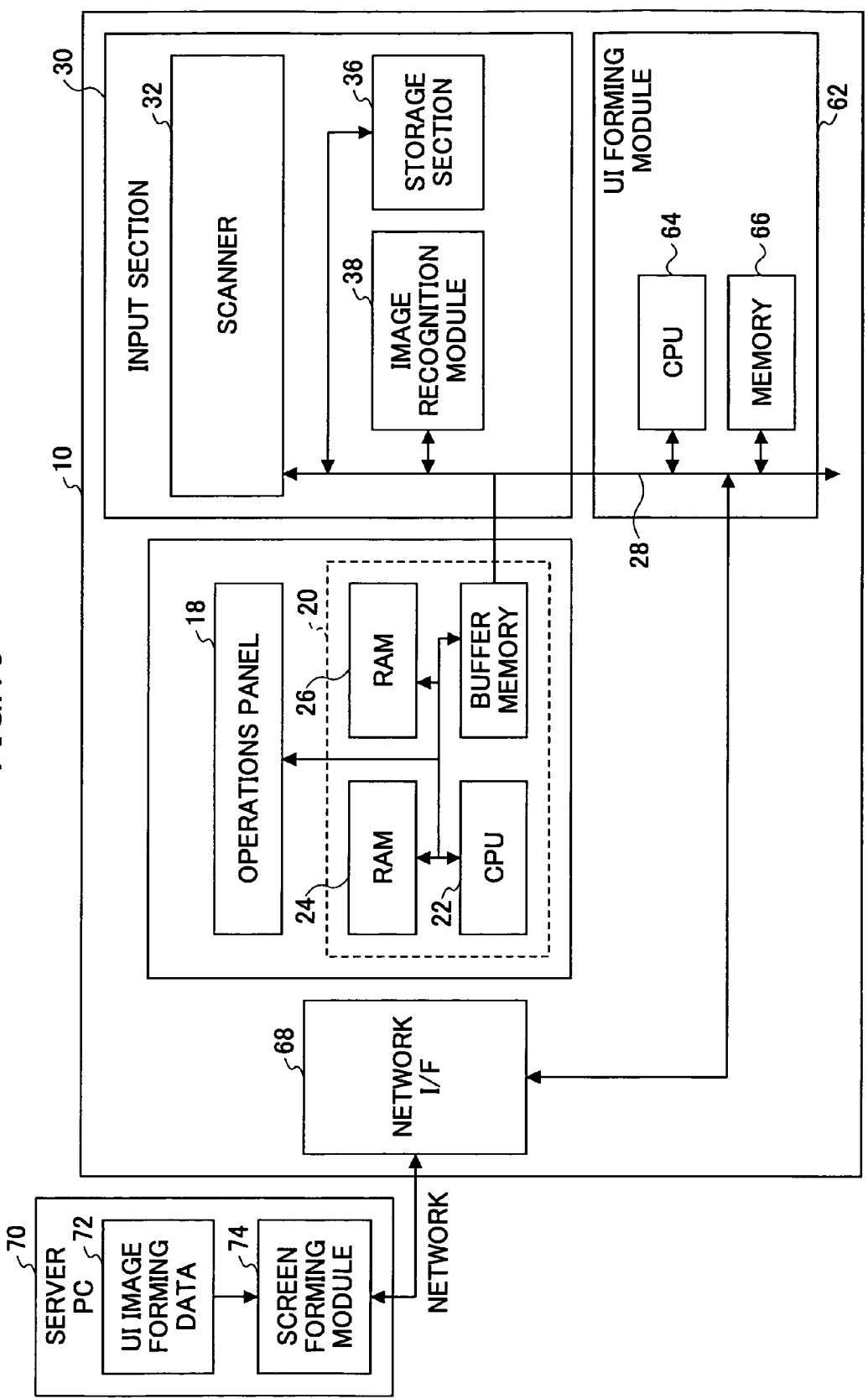
FIG. 10 is a block diagram schematically showing a hardware configuration of an image processing apparatus according to a third embodiment the present invention.

FIG. 10 is a block diagram schematically showing a configuration of an image processing apparatus 10 according to a third embodiment of the present invention. The image processing apparatus 10 shown in FIG. 10 comprises components that are generally the same as those in FIG. 8, and further comprises a network interface 68. The image processing apparatus 10 can communicate with an information processing apparatus 70 as necessary, which may be a server, a personal computer, or another image processing apparatus, via a network, such as the Internet, a LAN, or a WAN, using a suitable protocol or system, such as TCP/IP, UDP (User Datagram Protocol), or Ethernet™.

The information processing apparatus 70 comprises a processing unit (CPU) such as one of Pentium™-Pentium IV™ or a POWER PC™, and a RAM used for processing by the CPU, and holds and executes application programs that are written in object-oriented or non-object-oriented programming languages such as C, C++, Visual C, Basic, Visual Basic, and Java™ and are executable on DOS™, MacOS™, Windows™, UNIX™, AIX™, LINUX, or other suitable operating systems.

In the embodiment illustrated in FIG. 10, the information processing apparatus 70 sends a user identifier to the image processing apparatus 10 to request user authentication. When user authentication succeeds, the image processing apparatus 10 sends a report indicating completion of the authentication to the information processing apparatus 70. Upon reception of the authentication completion report, the information processing apparatus 70 informs a module, e.g., the UI forming module 62, responsible for the image processing apparatus 10 which document data item is to be processed. Then, the UI forming module 62 causes the image recognition module 38 to read out the specified document data item and generate a recognition data item corresponding to image properties of the document data item. The UI forming module 62 receives the generated recognition data item from the image recognition module 38 and, based on the recognition data item, generates a UI image forming data item 72, such as a data item indicating center of fields, field shape, field size, and field color, for forming a UI image that corresponds to a UI image displayed on the operations panel 18.

If the network provides packet communications based on an Internet protocol such as IPv4 or IPv6, the UI forming module 62 writes the generated UI image forming data item 72 into a data region of a sending packet in a suitable format, such as text, HTML, XML, or SGML, and sends the packet to an IP address assigned to the information processing apparatus 70. The information processing apparatus reads out the UI image forming data item 72 from the data region of the received packet and stores the UI image forming data item 72 at an appropriate address. The information processing apparatus 70 reads out the UI image forming data item 72 from the address where the UI image forming data item 72 is written by using, e.g., a pointer variable, and causes a screen forming module 74 to form a UI image on a display screen 76 (described below) of the information processing apparatus 70. At the same time, the information processing apparatus 70 allocates a hotspot for generating a control command for controlling the image processing apparatus 10 according to selection on each of formed fields.

The image processing apparatus 10 of FIG. 10 may receive a command generated by touching or pointing at with a pointer device such as a mouse, the UI image displayed on the display screen 76 of the information processing apparatus 70, and perform an operation corresponding to the command generated by the UI image displayed on the display screen 76 of the information processing apparatus 70. In this embodiment, the UI image displayed on the display screen 76 of the information processing apparatus 70 is designed to generate a command for controlling the image processing apparatus 10 in response to a user input by, e.g., touching or clicking the UI image with the pointer device.

The generated control command is written into a packet or a frame, and sent to an IP address assigned to the image processing apparatus 10 or a MAC address of the network interface 68 via the network such as the Internet or a LAN. Upon reception of the packet, the image processing apparatus 10 reads out the control command from a data region, converts the control command sent from the information processing apparatus 70 into a corresponding command executable by the image processing apparatus 10 using, e.g., a control command—internal command conversion list, and performs an operation such as, e.g., printing or using mail.

Figure 11:
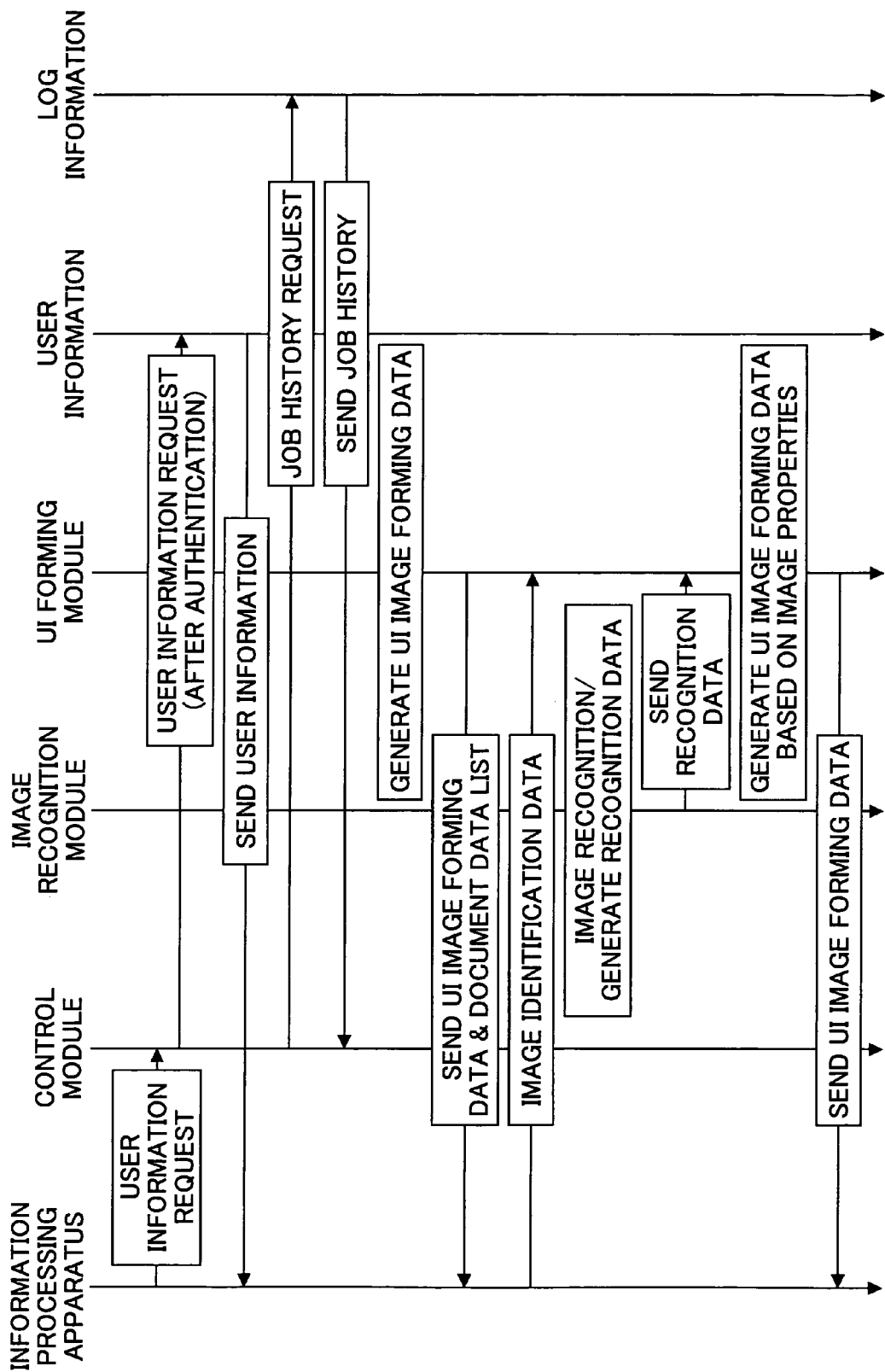
FIG. 11 is a chart showing a control sequence of the image processing apparatus of FIG. 10.

FIG. 11 is a chart showing a control sequence of the image processing apparatus 10 of FIG. 10. With reference to FIG. 11, the control module 20 of the image processing apparatus 10 receives a user identifier from the information processing apparatus 70. When authentication succeeds, the control module 20 passes a user information request sent from the information processing apparatus 70 to the user information management section. The user information management section sends user information to the information processing apparatus 70. The control module of the image processing apparatus 10 issues to the access log management section a job history request for a job history as necessary to acquire the job history. This process is not required if a UI image set by default is used in the user authentication mode instead of using a UI image formed base on the job history.

The UI forming module 62 sends, to the information processing apparatus 70, a data item to be used by the information processing apparatus 70 for forming a UI image that offers the same functions as the UI image set by default or the UI image formed based on the job history. The data item to be used by the information processing apparatus 70 is sent in, e.g., a text format, an HTML format, or an SGML format, together with a list of document data items for the user. The information processing apparatus 70 forms a UI image on the display screen 76 thereof based on the received data item using software written in an appropriate programming language, and shows the user the list of document data items that can be processed. A field for selecting a document data item to be processed may be formed in the UI image displayed on the information processing apparatus 70 such that a document data item held in the image processing apparatus 10 can be specified from the information processing apparatus 70. Alternatively, a send command may be linked to each document data item such that when the document data item is specified by a click of a pointer device, information indicating the specified document data item is sent to the image processing apparatus 10.

When, with the above-described process, an image identification data item for specifying a document data item is sent from the information processing apparatus 70 to the UI forming module 62 of the image processing apparatus 10, the UI forming module 62 searches the storage section 36 for the document data item specified by the image identification data item and sends the document data item to the image recognition module 38. The image recognition module 38 performs image recognition processing on the document data item and generates a recognition data item.

The image recognition module 38 then sends the recognition data item to the UI forming module 62. Upon reception of the recognition data item, the UI forming module 62 generates a UI image forming data item for forming a UI image that corresponds to a UI image displayed on the operations panel 18, and sends the generated UI image forming data item to the information processing apparatus 70. The information processing apparatus 70 displays a UI image on the display screen 76 based on the UI image forming data item.

Figure 12:
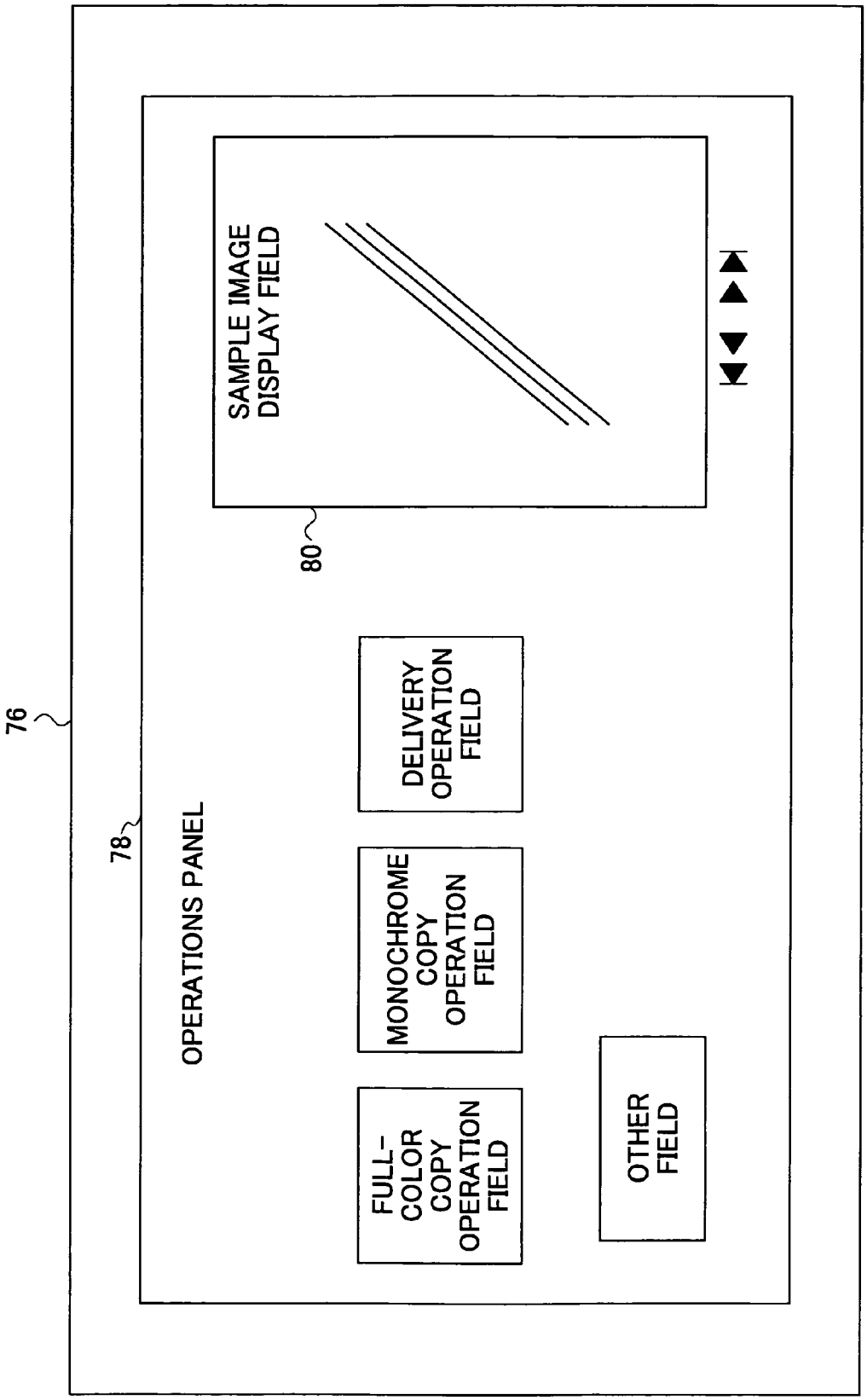
FIG. 12 is a schematic diagram showing a UI image according to an embodiment of the present invention.

FIG. 12 shows a UI image displayed on a window 78 of the display screen 76 of the information processing apparatus 70 according to an embodiment of the present invention. As shown in FIG. 12, a full-color copy operation field, a monochrome copy operation field, a delivery operation field, and an other field are formed on the display screen 76. In addition, a sample image display field 80 for displaying a sample image of the document data item selected using a paging function is formed on the display screen 76. The user can perform a desired operation on desired pages or all pages while viewing the image displayed in the sample image display field 80. In one embodiment of the present invention, plural fields and plural buttons for offering functions required by users for full-color copy operations, monochrome copy operations, etc., may be displayed at a time on the same screen.

Figure 13:
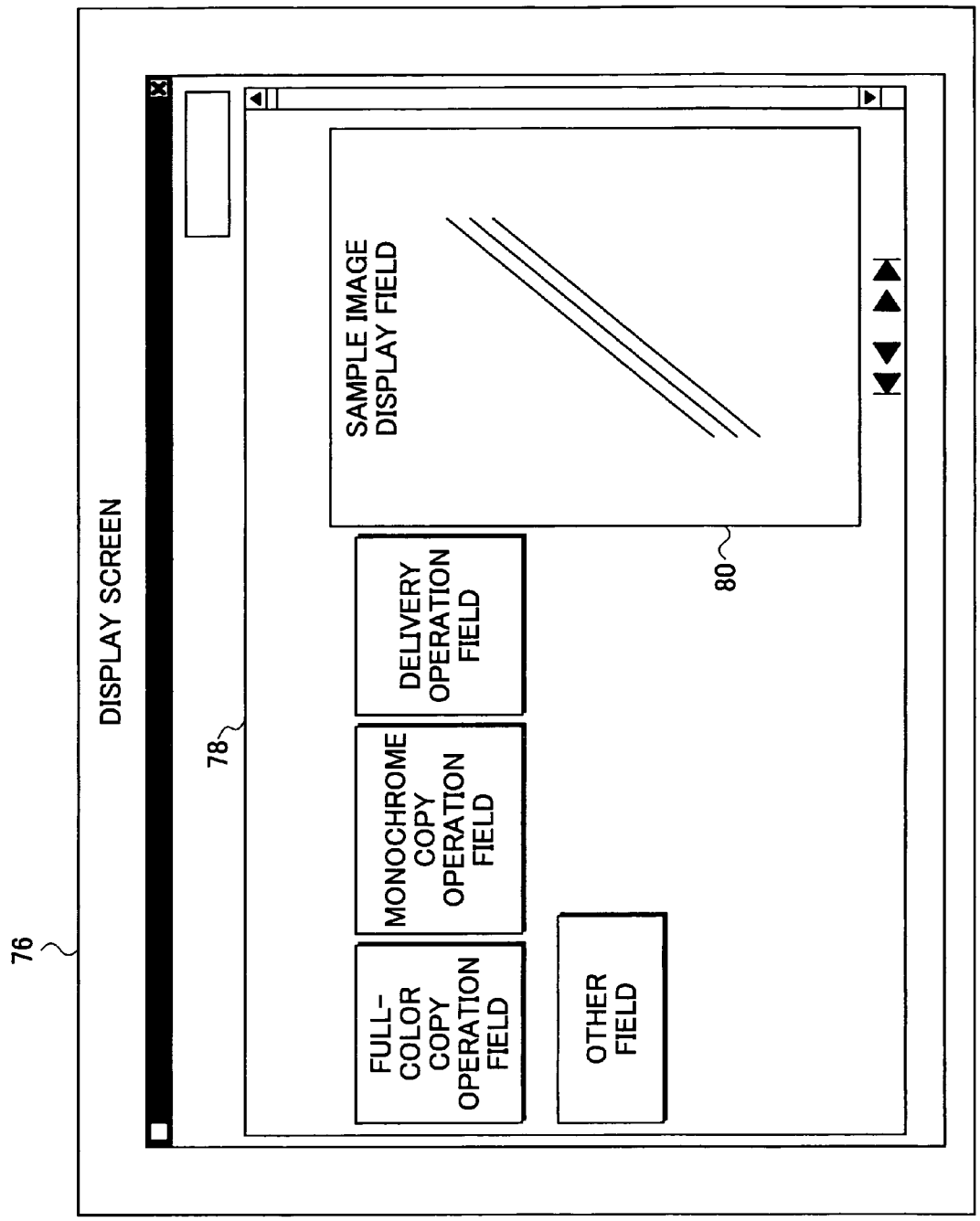
FIG. 13 is a schematic diagram showing a UI image according to an embodiment of the present invention.

FIG. 13 shows a UI image displayed on the display screen 76 of the information processing apparatus 70 according to another embodiment of the present invention. The UI image shown in FIG. 13 may be formed by loading the UI image from the image processing apparatus 10 using, e.g., Visual C or Java™. As shown in FIG. 13, the sample image display field 80 is formed on the window 78 where the UI image is displayed as in the example of FIG. 12. A user clicks a button on the display screen 76 using a pointer device or the like while viewing the sample image displayed on the screen. In response to the click by the user, a registered control command is sent to the image processing apparatus 10. Upon reception of the control command, the image processing apparatus 10 converts the received control command into a corresponding internal command executable by the image processing apparatus 10 or generates a corresponding control signal so as to perform an operation specified by the information processing apparatus 70.

C. Method of Controlling Image Processing Apparatus and Saving Documents

Figure 14:
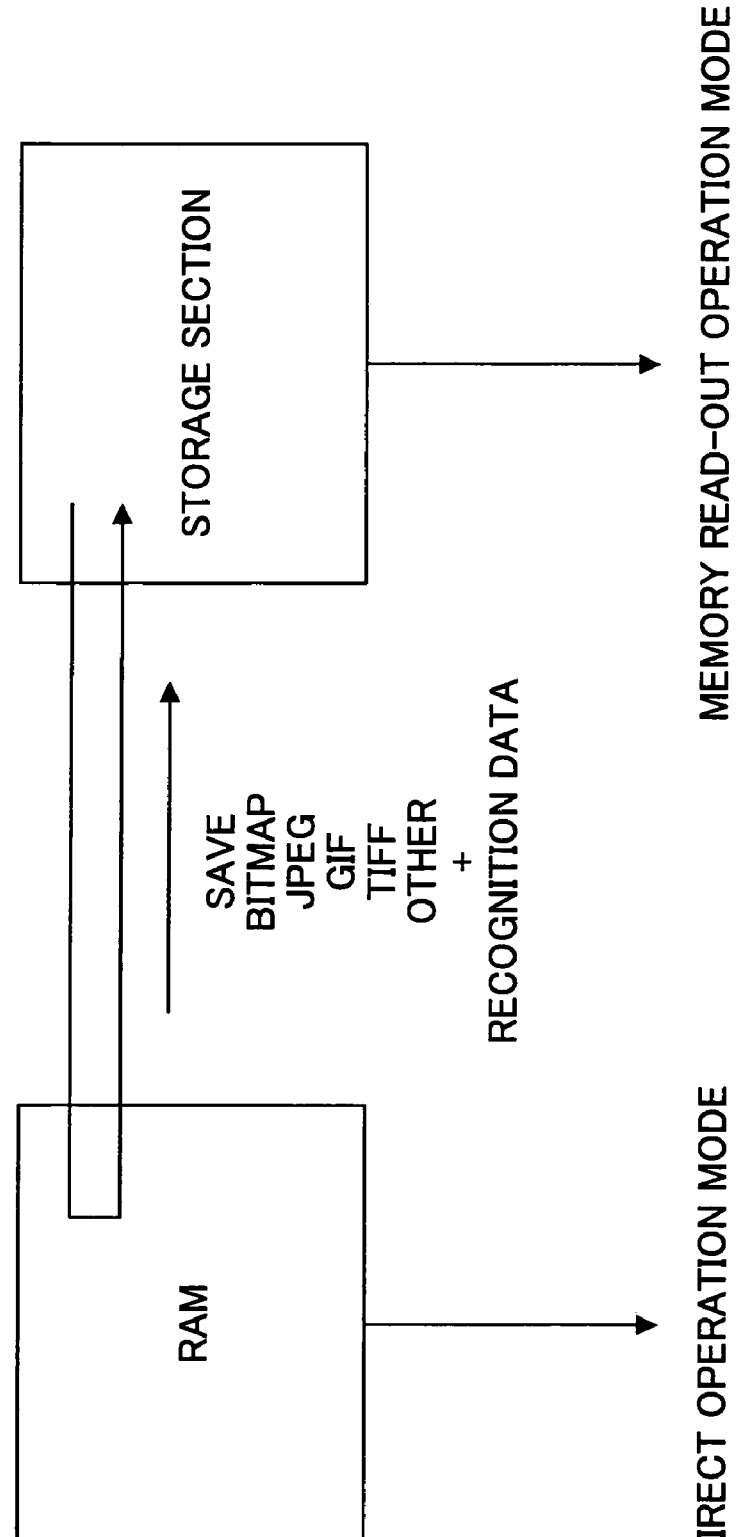
FIG. 14 is a diagram for explaining a method of saving a document data item according to an embodiment of the present invention.

FIG. 14 is a diagram for explaining operation modes of the image processing apparatus 10 according to an embodiment of the present invention. According to this embodiment, the image processing apparatus 10 can be in a direct operation mode or a memory read-out operation mode. In the direct operation mode, a user starts, e.g., the ADF from the operations panel 18 of the image processing apparatus 10, and a document data item read by, e.g., the ADF is directly copied, sent by facsimile, or delivered by mail. In the memory read-out operation mode, a document data read by, e.g., the ADF and held in the storage section 36 in an appropriate format, such as bitmap, JPEG, GIF, TIFF, or a format unique to the image processing apparatus 10 is read out; then a user selects an operation as necessary and causes the image processing apparatus 10 to perform the operation.

In the present invention, the image processing apparatus 10 can read out a document data item to which a recognition data item is not attached from memory, perform recognition processing to attach a recognition data item to the document data item, and store the document data item together with the recognition data item.

Figure 15:
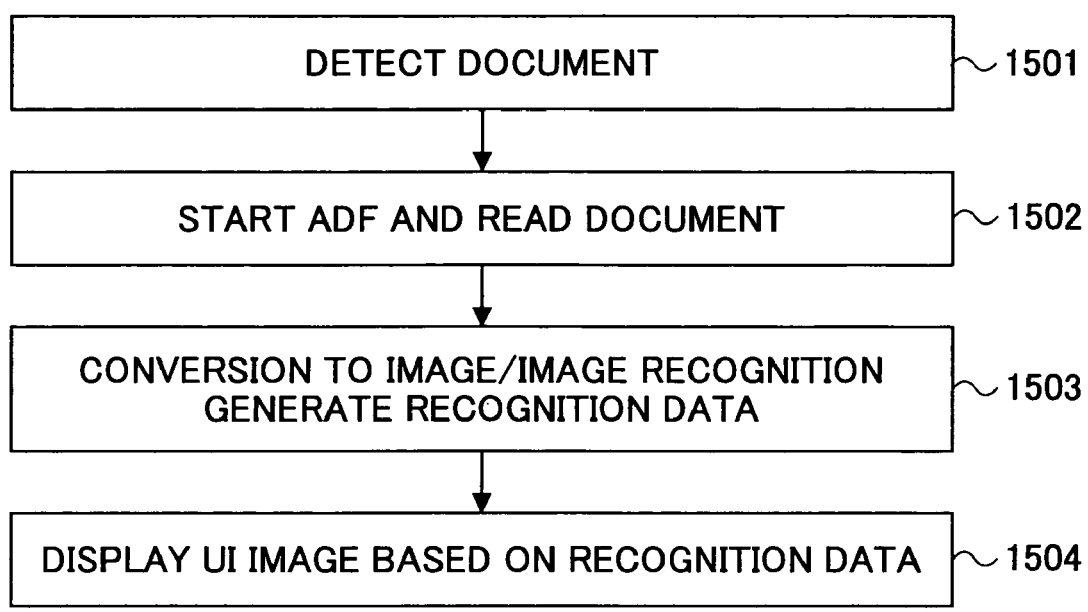
FIG. 15 is a flowchart illustrating an embodiment of a method of controlling an image processing apparatus according to an embodiment of the present invention.

FIG. 15 is a flowchart illustrating a first embodiment of a method of controlling the image processing apparatus 10 according to the present invention. According to the control method shown in FIG. 15, the image processing apparatus 10 detects that a document is placed by a user in Step 1501. Then in Step 1502, in response to a user input, the image processing apparatus 10 starts the ADF to read the document and loads a document data item into the RAM 34. In Step 1503, the image processing apparatus 10 performs recognition processing on the document data item held in the RAM 34 to determine image properties of the document data item. In Step 1504, the image processing apparatus 10 displays a UI image based on the image recognition result and waits for a user input.

Figure 16:
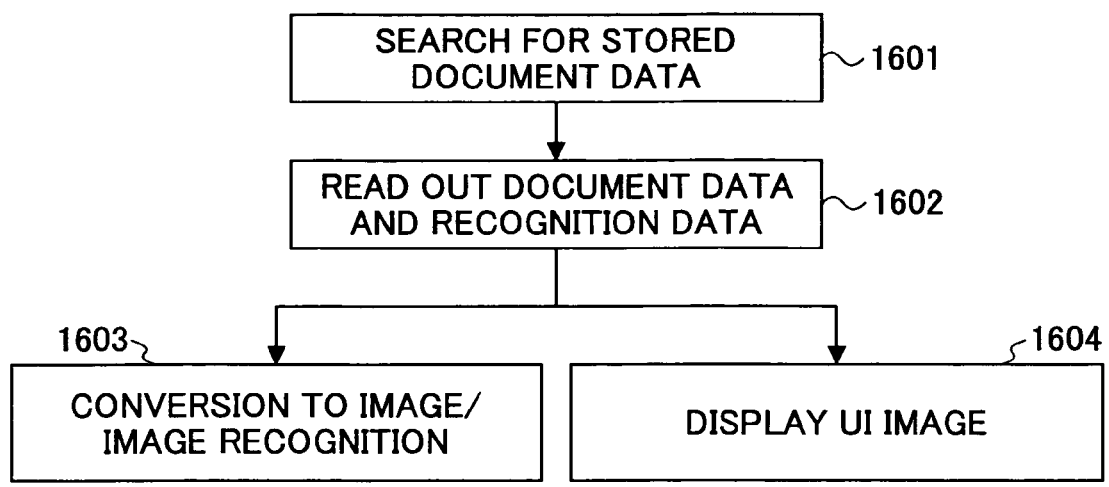
FIG. 16 is a flowchart illustrating a second embodiment of a method of controlling an image processing apparatus according to the present invention.

FIG. 16 is a flowchart illustrating a second embodiment of a method of controlling the image processing apparatus 10 according to the present invention. The embodiment illustrated in FIG. 16 is for processing a document data item that is held together with a recognition data item in the storage section 36. According to the control method shown in FIG. 16, a document data item specified by a user input is searched for in the storage section 36 in Step 1601. In Step 1602, the detected document data item is read out to the RAM 34 together with a recognition data item thereof. In Step 1603, conversion into an image and image recognition are performed. In parallel with Step 1603, in Step 1604, a UI image that is formed based on a recognition code is displayed on the operations panel 18. In the embodiment shown in FIG. 16, operations for displaying a UI image on the operations panel 18 can be performed in parallel with image recognition processing. Accordingly, it is possible to display a UI image corresponding to a document data item while reducing the time that a user waits for the recognition result.

Figure 17:
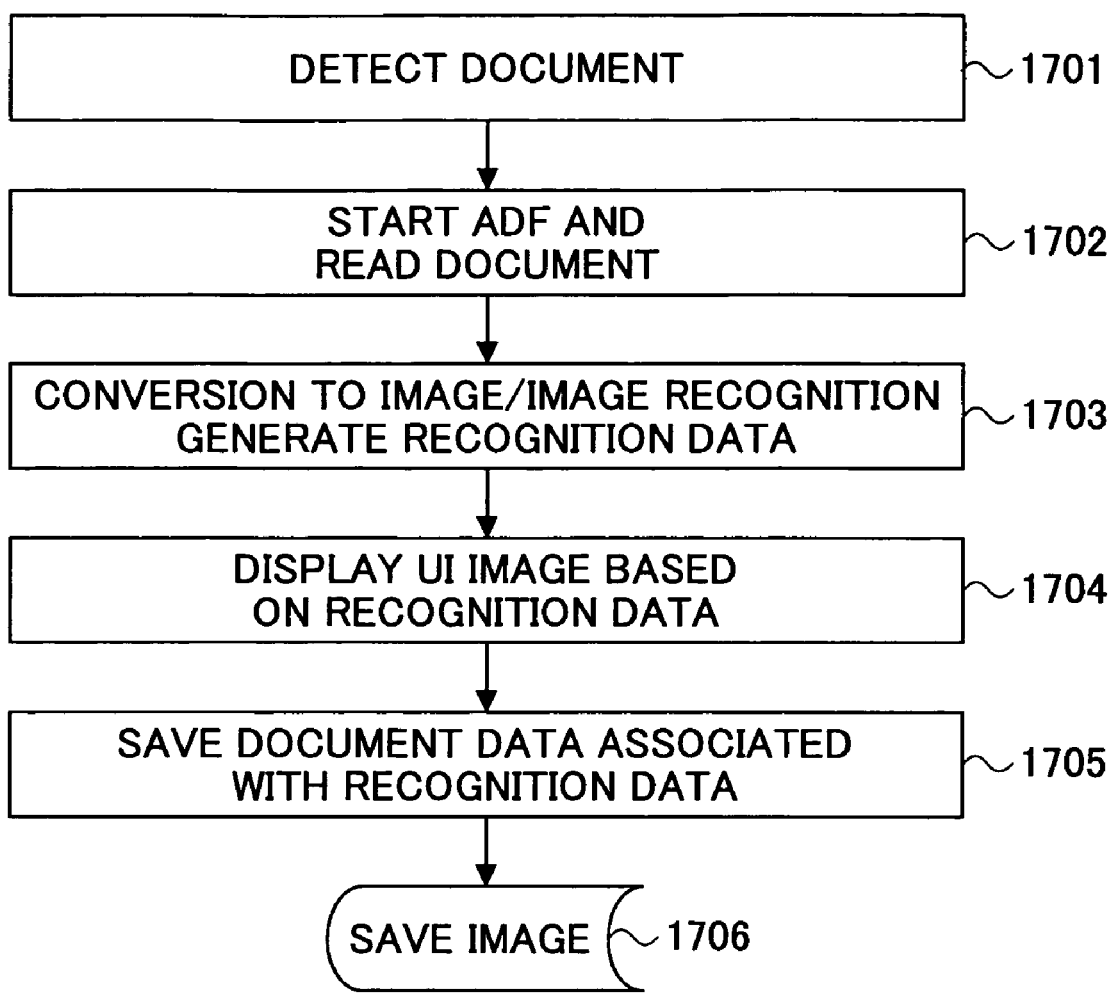
FIG. 17 is a flowchart illustrating a third embodiment of a method of controlling an image processing apparatus according to the present invention.

FIG. 17 is a flowchart illustrating a third embodiment of a method of controlling the image processing apparatus 10 according to the present invention. The embodiment illustrated in FIG. 17 is for associating recognition data to document data read by the ADF or the like and saving the document data associated with the recognition data. As shown in FIG. 17, the image processing apparatus 10 detects a document placed by a user in Step 1701. In Step 1702, the ADF is started to read the placed document. In Step 1703, a document data item of the read document is converted into an image in a format processible by the image processing apparatus 10, and image recognition processing is performed so as to generate a recognition data item. In Step 1704, a UI image formed based on the recognition data item is displayed on the operations panel 18. In Step 1705, according to a user input, the document data item which is associated with the recognition data item thereof is held in the storage section 36 in an appropriate format, so that in Step 1706, the document data item is saved as an image.

According to the present invention, recognition data items may be registered as strings or characters for identifying at least two or four types of image properties into a dedicated address field in the storage section 36. Alternatively, recognition data items may be added to and registered with image identification codes for specifying document data items. Recognition data items may be registered as binary code when saved together with document data items. In the case where a recognition data item is registered together with an image identification code using binary code, if, e.g., 32 bits are allocated for the image identification code, the last one or two bits may be allocated for the recognition data item.

Figure 18:
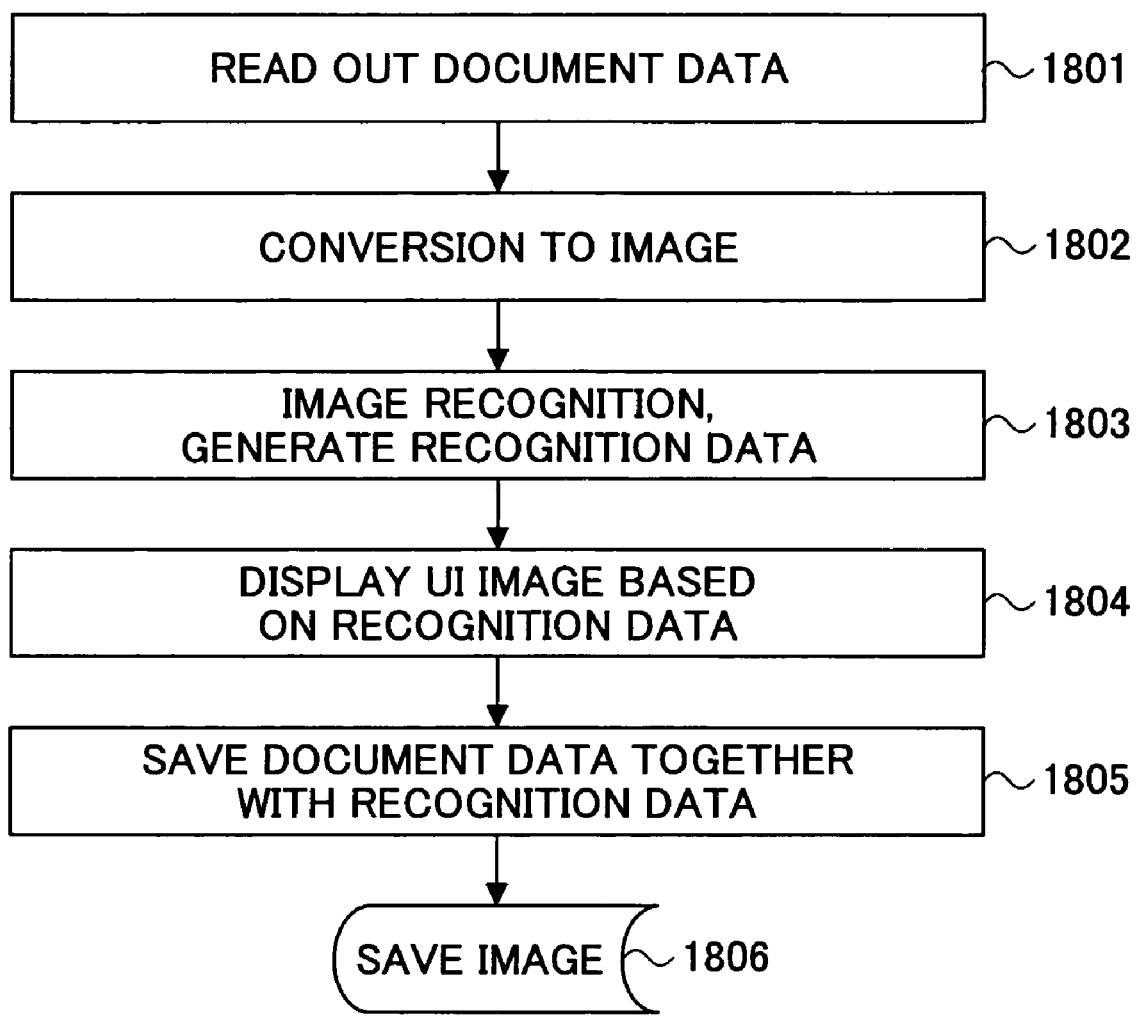
FIG. 18 is a flowchart illustrating a fourth embodiment of a method of controlling an image processing apparatus according to the present invention.

FIG. 18 is a flowchart illustrating a fourth embodiment of a method of controlling the image processing apparatus 10 according to the present invention. The embodiment illustrated in FIG. 18 is for reading out a document data item saved without a recognition data item, providing an appropriate UI image to a user, generating a recognition data item, and then saving the recognition data item in the storage section 36. According to the control method illustrated in FIG. 18, a document data item held in the storage section 36 is read out to the RAM 34 in Step 1801. In Step 1802, the document data item is converted into an image so as to edit the image itself. In Step 1803, determination of properties of the image of the document data item is performed to generate a recognition data item. In Step 1804, a UI image formed based on the recognition data item is displayed on the operations panel 18. Then in Step 1805, the recognition data item and the document data item are held in the storage section 36 together with an image identification data item, so that, in Step 1806, the document data item is saved as an image. The term "edit" as used herein indicates operations for compiling plural documents including, e.g., a full-color document and a monochrome document into one document, operations for attaching predetermined stamps (e.g. Confidential, logo, page number), operations for editing images themselves using an image editing tool, and other various operations for processing document data items using software.

FIGS. 19A and 19B show corresponding structures of data items generated by image recognition processing. FIG. 19A shows a data structure including a field where recognition data items for differentiating between binary images and multilevel halftone images, etc., are written when document data items are saved into the storage section 36. FIG. 19B shows a data structure including a field where recognition data items are added as string arrays to and registered together with image identification codes for uniquely identifying document data items. Storage area identifiers can be described in any known format, such as file name+offset address value, relative address, absolute address or the like, that is applicable to hard disks, EPROMs, EEPROMs, optical disks, CD-ROMs, CD-RWs, DVDs, DVD-RWs and the like. Document data items, such as those identified by image identification codes 0001-003, can be registered as single data items regardless of the data size.

Each of recognition data items for such document data items is generated as a result of image recognition processing on an entire document data item, and does not necessarily correspond to pages desired by a user. Accordingly, recognition data items are suitable for users who perform operation in units of document data items. In the case of a document data item specified by an image identification code 0004, recognition data items for individual pages are generated in view of paging such that the document data item is divided into and saved as page segments having appropriate sizes. In this case, the image identification code can be used as a common index for a read-out operation. Thus, if a user specifies the image recognition code to call up a document, the user can refer to all the pages of the document. The user can also perform operations on desired pages based on the corresponding recognition data items.

Referring to FIG. 19B, recognition data items are added as string arrays to and registered together with image identification codes. As in the embodiment shown in FIG. 19A, storage area identifiers may be described in any format, such as absolute address, relative address or the like, that is suitable for the type of a device forming the storage section 36. In the embodiment shown in FIG. 19B, recognition data items are added as strings or the like to rear parts of corresponding image identification codes such that a document data item and the corresponding recognition data item can be acquired together by specifying an image identification code. In the embodiment shown in FIG. 19B, as in the embodiment shown in FIG. 19A, document data items identified by image identification codes 0001-0003 are formed as single data items regardless of the data size. Each of document data items identified by an image recognition code 0004 is saved as a page segment including one or more pages. Page segments are identified by specific strings added to the image identification codes. Recognition data items for corresponding page segments are also added as strings. In the present invention, use of image identification codes in the formats shown in FIGS. 19A and 19B is not necessarily required, and file names desired by users may alternatively be used for registration.

In the present invention, as long as system resources such as memory and speed of the image processing apparatus 10 allow, recognition data items can be registered in any format shown in FIGS. 19A and 19B. Moreover, as long as the same functions are provided, any format in addition to the formats shown in FIGS. 19A and 19B may be used.

The data shown in FIGS. 19A and 19B may be tagged with user identification IDs of users so as to prevent a user from referring to a document data item of other users according to a user authentication result. FIG. 20 shows another embodiment of a data structure according to the present invention.

The data shown in FIG. 20 are formed by registering the data in the format of FIG. 19A on a per authenticated user basis. The data structure shown in FIG. 20 can be formed by allocating a directory of, e.g., a hard disk, a folder, or a partition to each user.

In another embodiment, the tagged data shown in FIG. 20 can also be formed by forming user identification blocks in the hard disk and saving all the document data items in the same data block. A table defining which user can access which document data item may be stored in order to register which user can access which document data item. In further another embodiment of the present invention, not only access control on a per user basis but also access control on a per user group basis may be applicable. In this case, groups with different access rights, such as an "operator." group and a "general user" group, may be provided such that access control is performed on the per user group basis. Data in the structure shown in FIG. 19 may be tagged in the same manner for enabling operations based on user data. With the tagged data structure, processing efficiency and usability of the image processing apparatus 10 through user interfaces are improved while improving security for each user.

Figure 21:
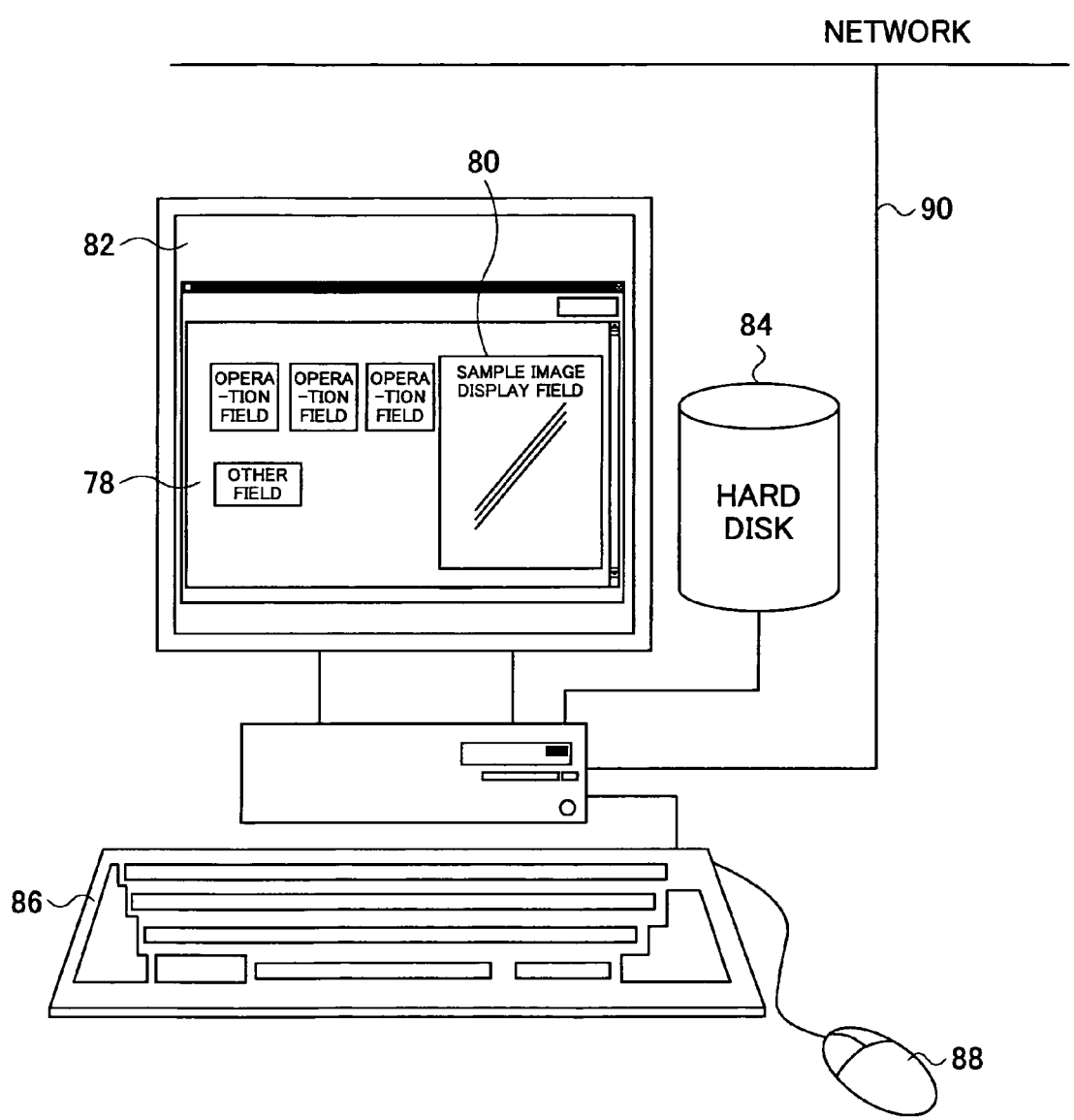
FIG. 21 is a schematic diagram illustrating an information processing apparatus according to an embodiment of the present invention.

FIG. 21 is a schematic diagram illustrating an information processing apparatus 82 that has a program for executing image recognition processing according to an embodiment of the present invention. The information processing apparatus 82 comprises a CPU and a memory such as RAM used for processing performed by the CPU. The information processing apparatus 82 holds processed data items in a hard disk 84, etc., such that the data items can be loaded in or sent out in response to a request. The information processing apparatus 82 further comprises input/output units, such as a keyboard 86 and a mouse 88 for users, and performs operations in response to user inputs.

The information processing apparatus 82 further comprises a Web browser, and is connected to a network 90, such as the Internet, a LAN, or a WAN, comprising a communication platform such as optical transmission system, ADSL, ISDN, or a public telephone line using an appropriate protocol such as TCP/IP or UDP. The network 90 is connected to the image processing apparatus 10 of the present invention, other information processing apparatuses, and a server for providing Web services, allowing data transmission using an http protocol or other protocols. The information processing apparatus 82 shown in FIG. 21 acquires a document data item from an appropriate destination, performs image recognition on the acquired document data item, and displays a UI image including a sample image display field 80 that allows execution of operations corresponding to image properties of the acquired document data item.

Fields displayed on the screen in the embodiment shown in FIG. 21 may be for operations such as mail transmission, facsimile, color printing, monochrome printing, and saving. These fields are provided as hotspots. In the embodiment shown in FIG. 21, if a user selects, e.g., a "save" operation, the information processing apparatus 82 saves a data item together with a recognition data item generated according to the present invention in the hard disk 84. Programs for implementing methods of the present invention may be configured as independent software, or may be configured as software modules of printer utility software installed in the information processing apparatus 82.

While the present invention is described above with reference to specific embodiments illustrated in the accompanying drawings, it should be understood that the present invention is not limited to the embodiments disclosed herein. All such similar substitutes and modifications apparent to those skilled in the art are deemed to be within the spirit, scope and concept of the invention.

The present application is based on Japanese Priority Application No. 2005-111557 filed on Apr. 8, 2005, with the Japanese Patent Office, the entire contents of which are hereby incorporated by reference.

What is claimed is:

1. An image processing apparatus that controls a user interface according to image properties, comprising:
    a document data acquiring unit to acquire document data;
    an image recognizing unit to determine the image properties of the document data including a color and a gray level of the document data so as to generate recognition data; and
    a user interface providing unit to receive the recognition data so as to provide the user interface, wherein operations that can be performed on the document data by the image processing apparatus through the user interface vary according to the recognition data,
    wherein the image recognizing unit differentiates between a monochrome binary image and a multilevel image based on gray level data and two-dimensional dispersion of pixels contained in the document data so as to generate the recognition data.

2. The image processing apparatus as claimed in claim 1, wherein a display unit that displays the user interface is an operations panel provided with the image processing apparatus or an information processing apparatus connected to the image processing apparatus via a network.

3. The image processing apparatus as claimed in claim 2, wherein the information processing apparatus causes the image processing apparatus to perform any of the operations on the document data.

4. The image processing apparatus as claimed in claim 1, wherein the document data acquiring unit includes an optical reading device; and the image processing apparatus is a multi-function peripheral.

5. A method of controlling an image processing apparatus that controls a user interface according to image properties, the method causing the image processing apparatus to execute:
    a step of acquiring document data;
    a step of generating recognition data by determining image properties of the document data including a color and a gray level of the document data; and
    a step of providing the user interface, wherein operations that can be performed on the document data by the image processing apparatus through the user interface vary according to the recognition data,
    wherein a monochrome binary image and a multilevel image are differentiated between based on gray level data and two-dimensional dispersion of pixels contained in the document data so as to generate the recognition data.

6. The method as claimed in claim 5,
    wherein the image processing apparatus is a multi-function peripheral; and
    the step of generating the recognition data includes
        a step of acquiring gray level data and two-dimensional dispersion of pixels contained in the document data; and
        a step of determining whether the document data comprise a monochrome binary image or a multilevel image based on the acquired gray level data and the two-dimensional dispersion.

7. The method as claimed in claim 5, the method further causing the image processing apparatus to execute:
    a step of communicating with an information processing apparatus connected to the image processing apparatus via a network so as to cause the information processing apparatus to display the user interface.

8. An information processing apparatus for processing document data, comprising:
    a CPU;
    a first storage unit;
    an image recognizing unit to read out document data and determine image properties of the read-out document data including a color and a gray level of the document data so as to generate recognition data;
    a user interface providing unit to receive the recognition data so as to provide a user interface, wherein operations that can be performed on the document data through the user interface vary according to the recognition data; and
    a second storage unit to store a data structure in which the document data and the recognition data are associated with each other,
    wherein the image recognizing unit differentiates between a monochrome binary image and a multilevel image based on gray level data and two-dimensional dispersion of pixels contained in the document data so as to generate the recognition data.

9. An image forming apparatus for processing document data, comprising:
    a CPU;
    a first storage unit;
    an image recognizing unit to read out document data in response to an external input and determine image properties of the read-out document data including a color and a gray level of the document data so as to generate recognition data;
    a user interface providing unit to receive the recognition data so as to provide a user interface, wherein operations that can be performed on the document data through the user interface vary according to the recognition data; and
    a second storage unit to store a data structure in which user data corresponding to the external input, the document data, and the recognition data are associated with each other,
    wherein the image recognizing unit differentiates between a monochrome binary image and a multilevel image based on gray level data and two-dimensional dispersion of pixels contained in the document data so as to generate the recognition data.

10. A data processing method of processing document data, the method causing an information processing apparatus including a CPU and a storage unit to execute:
    a step of reading out document data and determining image properties of the read-out document data including a color and a gray level of the document data so as to generate recognition data;
    a step of receiving the recognition data so as to provide a user interface, wherein operations that can be performed on the document data through the user interface vary according to the recognition data; and
    a step of generating and storing a data structure in which the document data and the recognition data are associated with each other,
    wherein a monochrome binary image and a multilevel image are differentiated between based on gray level data and two-dimensional dispersion of pixels contained in the document data so as to generate the recognition data.

* * * * *